United States Patent
Ollila

(10) Patent No.: US 12,483,804 B2
(45) Date of Patent: Nov. 25, 2025

(54) SUBSAMPLING AND WOBULATION IN COLOUR FILTER ARRAYS HAVING SMALLEST REPEATING UNITS WITH DIFFERENT SUB-UNITS

(71) Applicant: Varjo Technologies Oy, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 44 days.

(21) Appl. No.: 18/533,423

(22) Filed: Dec. 8, 2023

(65) Prior Publication Data
US 2025/0193544 A1    Jun. 12, 2025

(51) Int. Cl.
| | |
|---|---|
| H04N 25/48 | (2023.01) |
| H04N 23/62 | (2023.01) |
| H04N 23/84 | (2023.01) |
| H04N 25/11 | (2023.01) |
| H04N 25/13 | (2023.01) |
| H04N 25/131 | (2023.01) |
| H04N 25/445 | (2023.01) |
| H04N 25/78 | (2023.01) |

(52) U.S. Cl.
CPC ............. *H04N 25/48* (2023.01); *H04N 23/62* (2023.01); *H04N 23/84* (2023.01); *H04N 25/11* (2023.01); *H04N 25/13* (2023.01); *H04N 25/131* (2023.01); *H04N 25/135* (2023.01); *H04N 25/445* (2023.01); *H04N 25/78* (2023.01); *H04N 25/134* (2023.01)

(58) Field of Classification Search
CPC ...... H04N 25/48; H04N 25/155; H04N 25/11; H04N 25/13; H04N 25/131; H04N 25/134135; H04N 3/155
See application file for complete search history.

(56) References Cited

U.S. PATENT DOCUMENTS

| | | | | |
|---|---|---|---|---|
| 6,078,038 A | * | 6/2000 | Cooper | H04N 5/74 250/234 |
| 6,885,402 B1 | * | 4/2005 | Misawa | H04N 25/42 348/E3.018 |
| 2002/0139920 A1 | * | 10/2002 | Seibel | A61B 5/0062 250/208.1 |

(Continued)

FOREIGN PATENT DOCUMENTS

EP           981245 A2  *  2/2000  ............... G02B 7/34

*Primary Examiner* — David N Werner
(74) *Attorney, Agent, or Firm* — ZIEGLER IP LAW GROUP LLC.

(57) ABSTRACT

Each smallest repeating unit (SRU) in a colour filter array has a first sub-unit (FSU) and a second sub-unit (SSU). For a first sub-image, first image data is read out from photo-sensitive cells that correspond to FSUs of SRUs lying in a row (R1-R3) or column, and by skipping reading out from photo-sensitive cells that correspond to SSUs of a first predefined percent (FPP) of the SRUs, while reading out the first image data from photo-sensitive cells that correspond to SSUs of a remainder of the SRUs. For a second sub-image, second image data is read out from photo-sensitive cells that correspond to FSUs of the FPP, whilst skipping reading out from photo-sensitive cells that correspond to FSUs of the remainder, and by skipping reading out from photo-sensitive cells that correspond to the SSUs of the SRUs. Sub-pixel shift is performed between the sub-images. Image(s) are then generated from the sub-images.

10 Claims, 7 Drawing Sheets

(56) References Cited

U.S. PATENT DOCUMENTS

| | | | |
|---|---|---|---|
| 2003/0149532 A1* | 8/2003 | Nagoshi | G01J 5/10 250/339.08 |
| 2004/0027363 A1* | 2/2004 | Allen | G09G 3/007 345/698 |
| 2004/0028293 A1* | 2/2004 | Allen | G09G 3/007 382/300 |
| 2011/0037855 A1* | 2/2011 | McEwen | H04N 25/48 348/E5.09 |
| 2011/0080487 A1* | 4/2011 | Venkataraman | H04N 13/239 348/E5.024 |
| 2012/0113119 A1* | 5/2012 | Massie | H04N 25/48 345/428 |
| 2014/0139684 A1* | 5/2014 | Binder | H04N 25/48 348/164 |
| 2015/0097108 A1* | 4/2015 | Bishay | H04N 23/11 250/208.1 |
| 2016/0029000 A1* | 1/2016 | Lenz | G02B 21/367 348/239 |
| 2018/0122443 A1* | 5/2018 | Tanzawa | G11C 5/025 |
| 2020/0358971 A1* | 11/2020 | Shim | H10F 39/813 |
| 2025/0039574 A1* | 1/2025 | Ollila | G06T 3/4069 |

\* cited by examiner

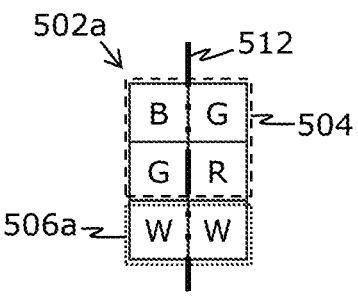
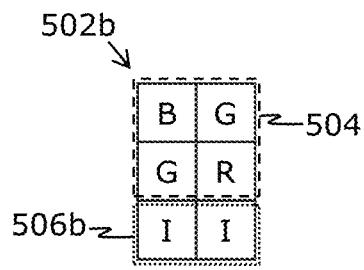
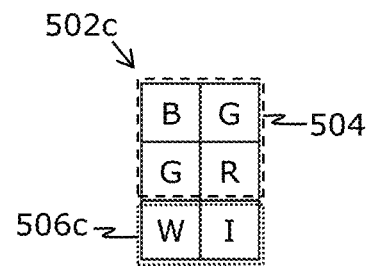
FIG. 5A  FIG. 5B  FIG. 5C
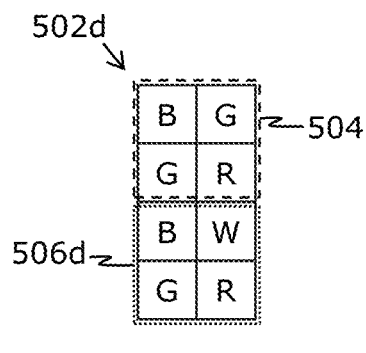
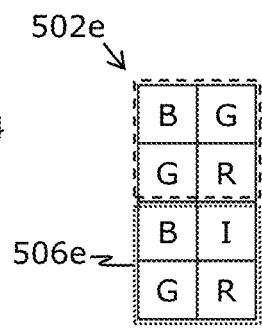
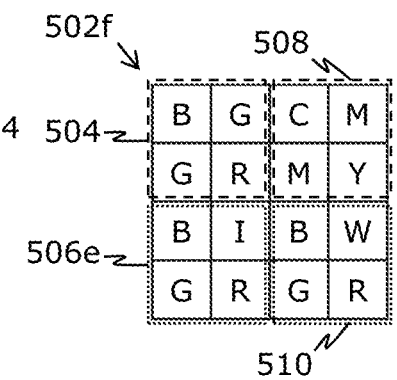
FIG. 5D  FIG. 5E  FIG. 5F
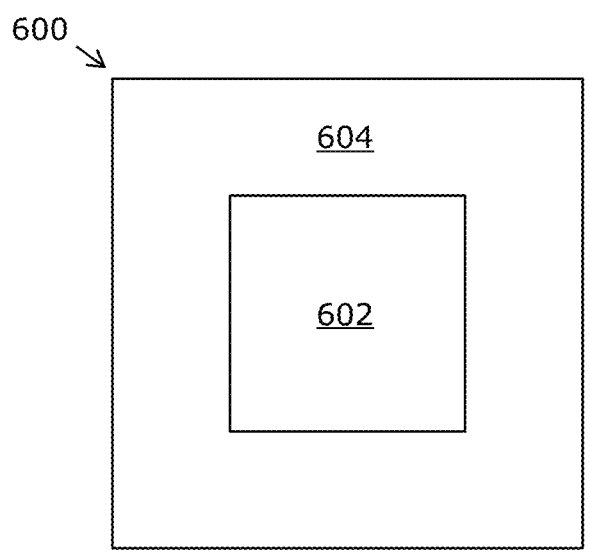
FIG. 6A

SUBSAMPLING AND WOBULATION IN COLOUR FILTER ARRAYS HAVING SMALLEST REPEATING UNITS WITH DIFFERENT SUB-UNITS

TECHNICAL FIELD

The present disclosure relates to imaging systems incorporating subsampling and wobulation in colour filter arrays (CFAs) having smallest repeating units with different sub-units. The present disclosure also relates to methods incorporating subsampling and wobulation in CFAs having smallest repeating units with different sub-units.

BACKGROUND

Nowadays, with an increase in the number of images being captured every day, there is an increased demand for developments in image processing. Such a demand is quite high and critical in case of evolving technologies such as immersive extended-reality (XR) technologies which are being employed in various fields such as entertainment, real estate, training, medical imaging operations, simulators, navigation, and the like. Several advancements are being made to develop image generation technology.

Conventional devices employ various equipment and techniques to generate high-resolution images. Some devices employ wobulation-based pixel shifting technology, wherein a sequence of images is captured while performing sub-pixel shifting of an image sensor. Multiple images in the sequence are then processed to generate a single high-resolution image.

However, provision of high spatial resolutions for the images using wobulation-based pixel-shifting technology has certain problems associated therewith. Firstly, conventional devices employing the wobulation-based pixel-shifting technology require four or more images to be captured and processed to generate a single high-resolution image. This undesirably drastically reduces a frame rate of generating the images, for example, to one-fourth or even less. Moreover, capturing and processing image data of the four or more images is highly computationally-intensive and time-consuming, and also requires very high computing power.

Secondly, existing equipment and techniques for image generation are inefficient in terms of generating images that have an acceptably high visual quality (for example, in terms of high resolution) throughout a wide field of view. This is because processing of image signals captured by pixels of an image sensor requires considerable processing resources, involves a long processing time, requires high computing power, and limits a total number of pixels that can be arranged on an image sensor for full pixel readout at a given frame rate. As an example, image signals corresponding to only about 10 million pixels on the image sensor may be processed currently (by full pixel readout) to generate image frames at 90 frames per second (FPS). Therefore, the existing equipment and techniques are not well-suited for generating such high visual quality images along with fulfilling other requirements in XR devices, for example, such as a high resolution (such as a resolution higher than or equal to 60 pixels per degree), a small pixel size, a large field of view, and a high frame rate (such as a frame rate higher than or equal to 90 FPS).

Therefore, in light of the foregoing discussion, there exists a need to overcome the aforementioned drawbacks.

SUMMARY

The present disclosure seeks to provide an imaging system and a method to generate high-quality, realistic images at a high framerate, by processing at least two sub-images for which image data is read out from an image sensor in a selective manner. The aim of the present disclosure is achieved by an imaging system and a method which incorporate subsampling and wobulation in colour filter arrays having smallest repeating units with different sub-units, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIGS. 5A, 5B, 5C, 5D, 5E, and 5F illustrate different examples of a smallest repeating unit of a colour filter array, in accordance with an embodiment of the present disclosure; and FIG. 6A illustrates different regions of a photo-sensitive surface of an image sensor, FIG. 6D illustrates overall image data that is read out from the first region, FIGS. 6E and 6F illustrate how the first image data and the second image data are read out from a second region of the photo-sensitive surface for capturing the first sub-image and the second sub-image, respectively, while FIG. 6G illustrates overall image data that is read out from the second region, in accordance with an embodiment of the present disclosure.

DETAILED DESCRIPTION OF EMBODIMENTS

Figure 1:
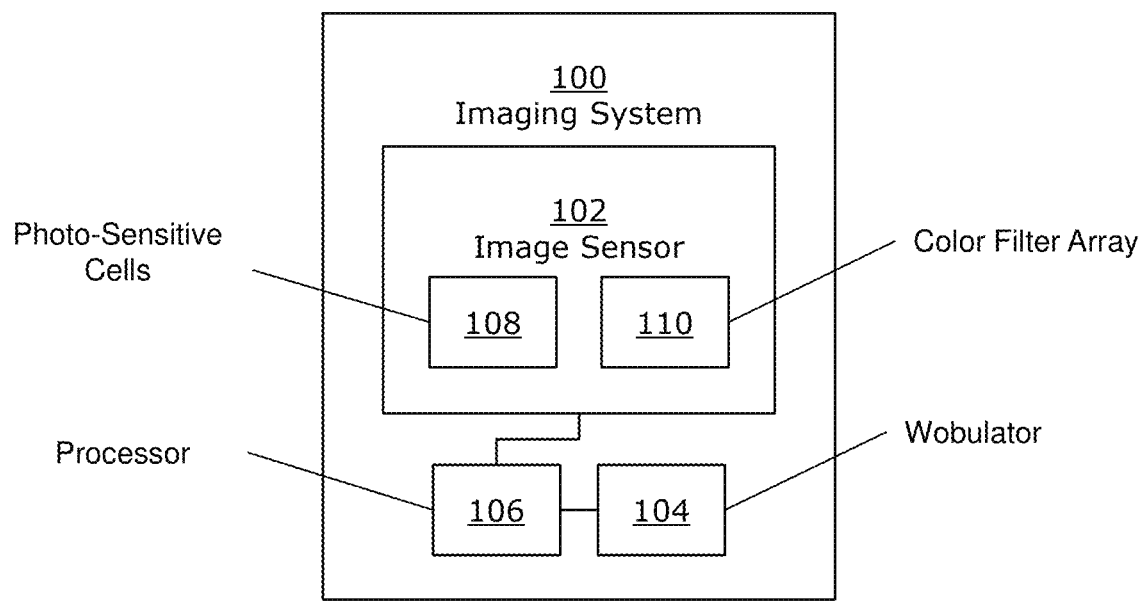
FIG. 1 illustrates a block diagram of an architecture of an imaging system incorporating subsampling and wobulation in colour filter arrays having smallest repeating units with different sub-units, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides an imaging system comprising:
an image sensor comprising:
  a plurality of photo-sensitive cells arranged on a photo-sensitive surface of the image sensor; and
  a colour filter array comprising a plurality of smallest repeating units, the plurality of smallest repeating units being arranged in rows and columns, wherein:
    a given smallest repeating unit comprises at least a first sub-unit and a second sub-unit,
    the first sub-unit comprises colour filters of at least three different colours,
    the second sub-unit comprises at least one other colour filter that allows to pass through at least one of: (i) at least three wavelengths corresponding to respective ones of the at least three different colours, (ii) at least one infrared wavelength;
a wobulator that is to be employed to perform sub-pixel shifts when capturing sub-images with the image sensor; and
at least one processor configured to:
  obtain at least two sub-images from the image sensor, wherein when obtaining the at least two sub-images, the at least one processor is configured to:
    for a first sub-image from amongst the at least two sub-images, read out first image data from those photo-sensitive cells in at least a first region of the photo-sensitive surface that correspond to first sub-units of smallest repeating units lying in a given row or column;
    for the first sub-image, skip reading out from those photo-sensitive cells in at least the first region that correspond to second sub-units of a first predefined percent of the smallest repeating units lying in the given row or column, whilst reading out the first image data from those photo-sensitive cells in at least the first region that correspond to second sub-units of a remainder of the smallest repeating units lying in the given row or column;
    for a second sub-image from amongst the at least two sub-images, read out second image data from those photo-sensitive cells in at least the first region that correspond to first sub-units of the first predefined percent of the smallest repeating units lying in the given row or column, whilst skipping reading out from those photo-sensitive cells in at least the first region that correspond to first sub-units of the remainder of the smallest repeating units lying in the given row or column; and
    for the second sub-image, skip reading out from those photo-sensitive cells in at least the first region that correspond to the second sub-units of the smallest repeating units lying in the given row or column;
  control the wobulator to perform at least one sub-pixel shift between the at least two sub-images, wherein the at least one sub-pixel shift is performed along a longitudinal axis of the given smallest repeating unit; and
  process the at least two sub-images, to generate at least one image.

In a second aspect, an embodiment of the present disclosure provides a method comprising:
obtaining at least two sub-images from an image sensor, wherein the image sensor comprises a plurality of photo-sensitive cells arranged on a photo-sensitive surface of the image sensor, and a colour filter array comprising a plurality of smallest repeating units, the plurality of smallest repeating units being arranged in rows and columns, wherein a given smallest repeating unit comprises at least a first sub-unit and a second sub-unit, the first sub-unit comprises colour filters of at least three different colours, the second sub-unit comprises at least one other colour filter that allows to pass through at least one of: (i) at least three wavelengths corresponding to respective ones of the at least three different colours, (ii) at least one infrared wavelength, wherein the step of obtaining the at least two sub-images comprises:
  for a first sub-image from amongst the at least two sub-images, reading out first image data from those photo-sensitive cells in at least a first region of the photo-sensitive surface that correspond to first sub-units of smallest repeating units lying in a given row or column;
  for the first sub-image, skipping reading out from those photo-sensitive cells in at least the first region that correspond to second sub-units of a first predefined percent of the smallest repeating units lying in the given row or column, whilst reading out the first image data from those photo-sensitive cells in at least the first region that correspond to second sub-units of a remainder of the smallest repeating units lying in the given row or column;
  for a second sub-image from amongst the at least two sub-images, reading out second image data from those photo-sensitive cells in at least the first region that correspond to first sub-units of the first predefined percent of the smallest repeating units lying in the given row or column, whilst skipping reading out from those photo-sensitive cells in at least the first region that correspond to first sub-units of the remainder of the smallest repeating units lying in the given row or column; and
  for the second sub-image, skipping reading out from those photo-sensitive cells in at least the first region that correspond to the second sub-units of the smallest repeating units lying in the given row or column;
controlling a wobulator to perform at least one sub-pixel shift when capturing the at least two sub-images with the image sensor, wherein the at least one sub-pixel shift is performed along a longitudinal axis of the given smallest repeating unit; and
processing the at least two sub-images, to generate at least one image.

The present disclosure provides the aforementioned imaging system and the aforementioned method incorporating subsampling and wobulation in colour filter arrays having smallest repeating units with different sub-units, to generate highly accurate and realistic images at a high frame rate as compared to prior art, in computationally-efficient and time-efficient manner. Herein, instead of capturing and processing four or more sub-images, the at least two sub-images (corresponding to the at least one sub-pixel shift) are captured and processed for generating the at least one image. Additionally, a selective read out of the first image data and the second image data in at least the first region (in the aforementioned manner) facilitates in providing a high frame rate of images, whilst reducing computational burden, delays, and excessive power consumption. Beneficially, upon processing the first image data and the second image data, a high visual quality (for example, in terms of a native resolution, a high contrast, a realistic and accurate colour reproduction, and the like) is achieved in pixels of a region of the at least one image that corresponds to at least the first region, without compromising on the frame rate. The imaging system and the method are susceptible to cope with visual quality requirements, for example, such as a high resolution (such as a resolution higher than or equal to 60 pixels per degree), a small pixel size, and a large field of view, whilst achieving a high frame rate (such as a frame rate higher than or equal to 90 FPS). The imaging system and the method are simple, robust, fast, reliable, and can be implemented with ease.

It will be appreciated that the at least one image is generated in computationally-efficient and time-efficient manner, at a high (and controlled) frame rate, as compared to prior art. The frame rate is expressed in terms of frames per second (FPS), and may, for example, be 60 FPS, 90 FPS, 120 FPS, or higher. For example, when the one sub-pixel shift is performed pursuant to embodiments of the present disclosure, instead of performing three sub-pixel shifts (as required in the prior art), a frame rate drops to only ½ or ⅓, respectively, instead of ¼.

Throughout the present disclosure, the term "image sensor" refers to a device that detects light from a real-world environment at the plurality of photo-sensitive cells (namely, a plurality of pixels) to capture a plurality of image signals. The plurality of image signals are electrical signals pertaining to a real-world scene of the real-world environment. The plurality of image signals constitute the image data of the plurality of photo-sensitive cells. Examples of the image sensor include, but are not limited to, a charge-coupled device (CCD) image sensor, and a complementary metal-oxide-semiconductor (CMOS) image sensor. Image sensors are well-known in the art.

Throughout the present disclosure, the term "image data" refers to information pertaining to a given photo-sensitive cell of the image sensor, wherein said information comprises one or more of: a colour value of the given photo-sensitive cell, a depth value of the given photo-sensitive cell, a transparency value of the given photo-sensitive cell, an illuminance value (namely, a luminance value or a brightness value) of the given photo-sensitive cell. The colour value could, for example, be Red-Green-Blue (RGB) values, Red-Green-Blue-Alpha (RGB-A) values, Cyan-Magenta-Yellow-Black (CMYK) values, Red-Green-Blue-Depth (RGB-D) values, or similar. In some implementations, the image data is RAW image data that has been read out from the image sensor. The term "RAW image data" refers to image data that is unprocessed (or may be minimally processed) when obtained from the image sensor. The RAW form of image data is well-known in the art. In other implementations, the image data is partially-processed image data that is generated upon performing certain image signal processing (ISP) on the RAW image data, for example, in an ISP pipeline. The image data is well-known in the art.

It will be appreciated that the plurality of photo-sensitive cells could, for example, be arranged in a rectangular two-dimensional (2D) grid, a polygonal arrangement, a circular arrangement, an elliptical arrangement, a freeform arrangement, or the like, on the image sensor. In an example, the image sensor may comprise 25 megapixels arranged in the rectangular 2D grid (such as a 5000×5000 grid) on the photo-sensitive surface. Optionally, when the plurality of photo-sensitive cells are arranged in the rectangular 2D grid, the first image data and the second image data are read out in a line-by-line manner.

Optionally, the image sensor is a part of a camera that is employed to capture sub-image(s). Optionally, the camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Additionally, optionally, the camera is implemented as a depth camera. Examples of the depth camera include, but are not limited to, a Time-of-Flight (ToF) camera, a light detection and ranging (LIDAR) camera, a Red-Green-Blue-Depth (RGB-D) camera, a laser rangefinder, a stereo camera, a plenoptic camera, an infrared (IR) camera, a ranging camera, a Sound Navigation and Ranging (SONAR) camera. In an example, the camera may be implemented as a combination of the visible-light camera and the depth camera.

Throughout the present disclosure, the term "colour filter array" refers to a pattern of colour filters arranged in front of the plurality of photo-sensitive cells of the photo-sensitive surface, wherein the colour filter array (CFA) allows only specific wavelengths of light to pass through a given colour filter to reach a corresponding photo-sensitive cell of the photo-sensitive surface, for capturing corresponding image data. The CFA is well-known in the art. Typically, the photo-sensitive surface of the image sensor has millions of photo-sensitive cells.

Throughout the present disclosure, the term "smallest repeating unit" in the CFA refers to a smallest grid of colour filters that is repeated throughout the CFA. In other words, the smallest repeating unit may be understood as a building block that gets repeated (for example, horizontally and/or vertically) to form an entirety of the CFA. The given smallest repeating unit may, for example, be an M×N array of colour filters. It will be appreciated that when the plurality of smallest repeating units are arranged in the rows and the columns, it means that one smallest repeating unit is arranged after another smallest repeating unit in a sequential manner. The technical benefit of arranging the plurality of smallest repeating units in the aforesaid manner is simple, straightforward and easy implementation of the CFA and its associated image signal processing pipeline, and may also allow for performing wobulation (namely, sub-pixel shifting) conveniently and accurately. Moreover, such an arrangement aligns seamlessly with a typical row and column-wise reading mechanism of the image sensor. In an example, for sake of better understanding and clarity, a given portion of the CFA may comprise 12 smallest repeating units arranged in a 3×4 array, wherein a given smallest repeating unit from amongst the 12 smallest repeating units is a 3×2 array of colour filters. In such an example, a given smallest repeating unit would comprise 6 colour filters, and the CFA would comprise 72 colour filters.

Throughout the present disclosure, the term "sub-unit" of the given smallest repeating unit refers to a smaller grid of colour filters within the given smallest repeating unit. Notably, the given smallest repeating unit comprises at least the first sub-unit and the second sub-unit. This means that there could be more than two different sub-units in the given smallest repeating unit, i.e., the given smallest repeating unit may also comprise other sub-units, in addition to the first sub-unit and the second sub-unit.

Notably, the first sub-unit comprises the colour filters of the at least three different colours. In some implementations, the colour filters of the at least three different colours comprise at least one blue colour filter, at least one green colour filter, and at least one red colour filter. In such implementations, there could be at least two green colour filters, instead of the at least one green colour filter. Optionally, the colour filters of the at least three different colours the first sub-unit comprises colour filters similar to a Bayer CFA. The Bayer CFA could be one of: a standard Bayer CFA, a 4C Bayer CFA (also referred to as "quad" or "tetra", wherein a group of 2×2 pixels has a same colour filter), a 9C Bayer CFA (also referred to as "nona", wherein a group of 3×3 pixels has a same colour filter), a 16C Bayer CFA (also referred to as "hexadeca", wherein a group of 4×4 pixels has a same colour filter). In other implementations, the colour filters of the at least three different colours comprise at least one cyan colour filter, at least one magenta colour filter, and at least one yellow colour filter. In such implementations, there could be at least two magenta colour filters, instead of the at least one magenta colour filter.

Notably, the second sub-unit comprises the at least one other colour filter. It will be appreciated that the at least one other colour filter that allows to pass through the at least three wavelengths corresponding to the respective ones of the at least three different colours simultaneously, can be understood to be a white colour filter or a near-white colour filter. Furthermore, the at least one other colour filter that allows to pass through the at least one infrared wavelength (for example, lying in an infrared wavelength range) can be understood to be an infrared colour filter. Optionally, the second sub-unit further comprises colour filters of the at least three different colours. It will be appreciated that the second sub-unit does not necessarily have the colour filters of the at least three different colours same as that of the first sub-unit (as described earlier).

Optionally, a size of the first sub-unit and a size of the second sub-unit are same. Alternatively, optionally, the size of the first sub-unit and the size of the second sub-unit are different. In an example, the first sub-unit may be a 2×2 array of colour filters having one red colour filter, two green colour filters, and one blue colour filter. On the other hand, the second sub-unit may be a 1×2 array of colour filters having any one of: (i) two white or near-white colour filters, (ii) two infrared colour filters, (iii) one white or near-white colour filter and one infrared colour filter. Alternatively, the second sub-unit may be a 2×2 array of colour filters having one red colour filter, one green colour filter, one blue colour filter, and one white or near-white colour filter. Yet alternatively, the second sub-unit may be a 2×2 array of colour filters having one red colour filter, one green colour filter, one blue colour filter, and one infrared colour filter. These examples have been also illustrated in conjunction with FIGS. 5A, 5B, 5C, 5D, and 5E, for sake of better understanding and clarity.

In another example, the given smallest repeating unit may comprise a third sub-unit and a fourth sub-unit, in addition to the first sub-unit and the second sub-unit. In this regard, the first sub-unit may be a 2×2 array of colour filters having one red colour filter, two green colour filters, and one blue colour filter. The second sub-unit may be a 2×2 array of colour filters having one red colour filter, one green colour filter, one blue colour filter, and one infrared colour filter. The third sub-unit may be a 2×2 array of colour filters having one cyan colour filter, two magenta colour filters, and one yellow colour filter. The fourth sub-unit may be a 2×2 array of colour filters having one red colour filter, one green colour filter, one blue colour filter, and one white or near-white colour filter. Such a smallest repeating unit may be employed in a CFA that may be used in hyperspectral imaging, for highly accurate colour detection and highly accurate material detection. This example has been also illustrated in conjunction with FIG. 5F, for sake of better understanding and clarity.

Notably, the at least one processor controls an overall operation of the imaging system. The at least one processor is communicably coupled to at least the image sensor and the wobulator. Optionally, the at least one processor is implemented as an image signal processor. In an example, the image signal processor may be a programmable digital signal processor (DSP). Alternatively, optionally, the at least one processor is implemented as a cloud server (namely, a remote server) that provides a cloud computing service.

Throughout the present disclosure, the term "wobulator" refers to a device that is capable of performing sub-pixel shifts. The term "sub-pixel shift" refers to a pixel-level movement (namely, a pixel-level shifting) of the image sensor (or light incoming towards the image sensor) in a particular direction, for capturing a sub-image with the image sensor. It will be appreciated that a given sub-pixel shift could be performed, for example, by physically moving the image sensor and/or its corresponding optics (which may comprise optical elements, for example, such as lens, mirrors, and the like) by a given step size in a particular direction, or by optically steering the light (incoming towards the image sensor) by a given step size in a particular direction. The image sensor and/or the optics could be physically moved (namely, tilted and/or shifted) by the wobulator, for example, by way of using an actuator. In this regard, the wobulator may comprise at least the actuator. The optical steering could, for example, be done by way of using a liquid crystal device, a mems-actuated soft polymer, a micromirror, a lens, a liquid lens, adaptive optics and the like. It will be appreciated that the sub-pixel shifting (namely, the wobulation) could be performed by physically moving (in a horizontal direction and/or a vertical direction) or tilting only one optical element of the optics, in addition to physically moving the image sensor.

Alternatively, the sub-pixel shifting (namely, the wobulation) could be performed by physically moving or tilting an entirety of the optics, for example, using an electromagnetic actuator (such as a voice coil motor), in addition to physically moving the image sensor. Wobulators are well-known in the art. Information pertaining to step sizes will be explained later.

In some implementations, when only one sub-pixel shift is performed by the wobulator in one cycle of capturing sub-images, two sub-images are obtained from the image sensor. In other words, the two (different) sub-images are captured by the image sensor using the one sub-pixel shift, wherein a first sub-image from amongst the two sub-images is captured when the image sensor is at its actual (namely, original) position (i.e., the first sub-image is captured when the image sensor or the light incoming towards the image sensor has not been shifted yet), and a second sub-image from amongst the two sub-images is captured when the image sensor or the light incoming towards the image sensor is shifted (i.e., moved) according to the one sub-pixel shift.

In other implementations, when two sub-pixel shifts are performed by the wobulator in one cycle of capturing sub-images, three sub-images are obtained. In other words, the three (different) sub-images are captured by the image sensor using the two sub-pixel shifts, wherein a first sub-image from amongst the three sub-images is captured when the image sensor is at its actual position, a second sub-image from amongst the three sub-images is captured when the image sensor or the light incoming towards the image sensor is shifted according to one of the two sub-pixel shifts, and a third sub-image from amongst the three sub-images is captured when the image sensor or the light incoming towards the image sensor is shifted according to another of the two sub-pixel shifts.

It will be appreciated that when capturing the at least two sub-images, it is ensured that either the camera (or the image sensor) is capturing sub-images of a static real-world environment (i.e., only stationary objects or their parts are present in the real-world environment), or a change in a relative pose between the camera and a given object or its part present in the real-world environment is minimal/negligible. In this way, visual representation represented in the at least two sub-images would be significantly similar to each other, and thus it would be advantageous to generate the at least one image upon processing the at least two sub-images.

Notably, for the first sub-image, the first image data is selectively read out from at least the first region of the photo-sensitive surface of the image sensor. In particular, the at least one processor reads out those photo-sensitive cells that correspond to the first sub-units of the smallest repeating units lying in the given row or column. Moreover, in the (same) given row or column, the at least one processor does not read out (namely, skips) those photo-sensitive cells that correspond to the second sub-units of the first predefined percent of said smallest repeating units. The first predefined percent could be every $N^{th}$ smallest repeating unit in the given row or column. This means that a second sub-unit of every $N^{th}$ (for example, every $2^{nd}$ or every $3^{rd}$) smallest repeating unit in the given row or column would not be read out. Additionally, in the (same) given row or column, the at least one processor reads out those photo-sensitive cells that correspond to the second sub-units of the remainder of the smallest repeating units (namely, the smallest repeating units excluding the first predefined percent of the smallest repeating units). Optionally, the first predefined percent lies in a range of 10 percent to 90 percent of the smallest repeating units lying in the given row or column. More optionally, the first predefined percent lies in a range of 25 percent to 75 percent of the smallest repeating units lying in the given row or column.

It will be appreciated that the term "row" or "column" mentioned hereinabove refers to a row or a column of the smallest repeating units. It does not refer to a row or a column of individual photo-sensitive cells (namely, individual pixels) arranged on the photo-sensitive surface. Furthermore, when the first sub-unit and the second sub-unit of the given smallest repeating unit are vertically arranged with respect to each other, the smallest repeating units are to be understood to lie in the given row. On the other hand, when the first sub-unit and the second sub-unit of the given smallest repeating unit are horizontally arranged with respect to each other, the smallest repeating units are to be understood to lie in the given column.

Notably, for the second sub-image, the second image data is selectively read out from at least the first region of the photo-sensitive surface of the image sensor. In particular, the at least one processor reads out those photo-sensitive cells that correspond to the first sub-units of the first predefined percent of the smallest repeating units lying in the given row or column. This means that the first sub-units of those smallest repeating units (for example, every $N^{th}$ smallest repeating unit) in the given row or column for which the second sub-units are skipped while capturing the first sub-image, are read out. Moreover, in the (same) given row or column, the at least one processor does not read out those photo-sensitive cells that correspond to the first sub-units of the remainder of the smallest repeating units (namely, those smallest repeating units for which the second sub-units are read out while capturing the first sub-image). Additionally, in the (same) given row or column, the at least one processor does not read out those photo-sensitive cells that correspond to the second sub-units of the smallest repeating units.

It will be appreciated that, for the first sub-image, reading out the first image data from those photo-sensitive cells in at least the first region that correspond to the first sub-units of the smallest repeating units does not necessarily mean that all (i.e., 100 percent) of said photo-sensitive cells are read out. Thus, even when the aforesaid read out is performed only for a predefined percent (such as 95 percent or 99 percent) of said photo-sensitive cells that correspond to the first sub-units of the smallest repeating units, it should be considered as almost a full read out. Similarly, for the second sub-image, skipping reading out from those photo-sensitive cells in at least the first region that correspond to the second sub-units of the smallest repeating units does not necessarily mean that all (i.e., 100 percent) of said photo-sensitive cells are skipped. Thus, even when the aforesaid skipping is performed only for a predefined percent (such as 95 percent or 99 percent) of said photo-sensitive cells that correspond to the second sub-units of the smallest repeating units, it should be considered as almost a full skipping out.

It may be noted that the terms "first" and "second" with respect to the first sub-image and the second sub-image are used to merely distinguish between two different sub-images. Usage of such terms in no way refer to an order in which these two different sub-images would be captured with the image sensor. In other words, it is not necessary that the first sub-image is always captured prior to capturing the second sub-image, or the second sub-image is always captured upon capturing the first sub-image. Therefore, it can be understood that the first sub-image may be captured before or after capturing the second sub-image.

It will also be appreciated that the phrase "at least the first region" means that subsampling (i.e., selective read out) of the first image data and wobulation (namely, sub-pixel shifting, as discussed later) could only be performed for a particular region (for example, a gaze region) of the photo-sensitive surface, or could be performed for an entirety of the photo-sensitive surface. The first region could be a central region (for example, in case of fixed foveation implementations) or a gaze region (for example, in case of active foveation implementations) in the photo-sensitive surface.

Beneficially, a processing time for selectively reading out the first image data (for the first sub-image) and the second image data (for the second sub-image) in at least the first region is considerably lesser, as compared to a processing time for reading out image data from each and every photo-sensitive cell in at least the first region. In addition to this, reading out (and processing) the first image data and the second image data for those photo-sensitive cells in the first region that correspond to the first sub-units, enables in achieving a high visual quality (for example, in terms of a native resolution, a high contrast, a realistic and accurate colour reproduction, and the like) in corresponding pixels of the at least one image (that is generated upon processing the at least two sub-images). This is because the colour filters of the at least three different colours in the first sub-units facilitates in providing better colour reproduction and resolution in at least the first region. This may particularly be advantageous when the first region is the central region or the gaze region, as a gaze region of an image should typically have a high colour accuracy, as compared a peripheral region of said image. Moreover, in such a case, for the first region, reading out and processing image data (i.e., the first image data and/or the second image data) corresponding to the white or near-white colour filter and/or the infrared colour filter would be minimally required. It will be appreciated that such a selective read out of the first image data and the second image data in at least the first region also facilitates in providing a high frame rate of images. This implementation has been also illustrated in conjunction with FIGS. 6B, 6C and 6D, for sake of better understanding and clarity.

Notably, when performing the at least one sub-pixel shift, the image sensor and/or its corresponding optics is shifted by a step size (of the at least one sub-pixel shift) along a particular direction defined by the longitudinal axis of the given smallest repeating unit. The longitudinal axis refers to an axis along which the first sub-unit and the second sub-unit of the given smallest repeating unit are arranged relative to each other. This has been illustrated in conjunction with FIG. 5A, for sake of better understanding and clarity. It will be appreciated that when the first sub-unit and the second sub-unit of the given smallest repeating unit are vertically arranged with respect to each other, the longitudinal axis lies in a vertical direction, and the at least one sub-pixel shift would be performed in the vertical direction. On the other hand, when the first sub-unit and the second sub-unit of the given smallest repeating unit are horizontally arranged with respect to each other, the longitudinal axis lies in a horizontal direction, and the at least one sub-pixel shift would be performed in the horizontal direction.

Optionally, a step size of the at least one sub-pixel shift is Y pixels, wherein Y is an integer that lies in a range from 1 to Z, Z being equal to a number of pixels that lie in the first sub-unit along said longitudinal axis. Herein, the term "step size" refers to an amount or a distance by which the image sensor or the light incoming towards the image sensor is shifted/moved along the longitudinal axis, in order to perform the at least one sub-pixel shift. The step size is defined in terms of a number of photo-sensitive cells (namely, pixels). Lesser the step size of the at least one sub-pixel shift between the at least two sub-images, greater may be the image quality (for example, in terms of a resolution) of the at least one image that is generated upon processing the at least two sub-images, and vice versa. It will be appreciated that when the step size is Y pixels, wherein Y is the integer that lies in the range from 1 to Z, it means that the step size is an integer step size, wherein when performing the at least one sub-pixel shift, the image sensor (or the light incoming towards the image sensor) is shifted along said longitudinal axis by an amount defined by a size of one or more (complete) pixels that lie in the first sub-unit along said longitudinal axis. A reason for employing such an integer step size that can vary from 1 to Z is because of the fact that the size of the second sub-unit could be smaller than the size of the first sub-unit, for example, in a case when the second sub-unit may be a 1×2 array of colour filters having any one of: (i) two white or near-white colour filters, (ii) two infrared colour filters, (iii) one white or near-white colour filter and one infrared colour filter. The technical benefit of employing such an integer step size is that it facilitates in achieving an effect of demosaicking without having to perform an actual (i.e., a full and regular) demosaicking on image data of the plurality of photo-sensitive cells. This is because, a sub-pixel shift having a step size of Y pixels would facilitate in capturing two sub-images (namely, the first sub-image and the second sub-image) in which a same photo-sensitive cell of the image sensor receives light from neighbouring 3D points in the real-world environment. This allows for capturing more detailed visual information of a real-world scene in the at least one image (that is generated from the at least two sub-images) as compared to when only one sub-image is captured. Therefore, only a minimal demosaicking may actually be required when processing the two or more sub-images (as discussed later). In this way, upon said processing, the at least one image would be accurately and realistically generated.

Notably, the at least two sub-images are processed to generate the at least one image. It will be appreciated that a given image is a visual representation of the real-world environment. The term "visual representation" encompasses colour information represented in the given image, and additionally optionally other attributes associated with the given image (for example, such as depth information, luminance information, transparency information (namely, alpha values), polarization information and the like). It will be appreciated that the at least one image may comprise a single image that is generated upon processing the at least two sub-images collectively, or may comprise at least two images that are generated upon processing the at least two sub-images individually.

Optionally, when processing the at least two sub-images, the at least one processor is configured to perform interpolation and demosaicking on the first image data and the second image data, to generate the at least one image. The interpolation is performed because the first image data and the second image data are obtained (by the at least one processor) as subsampled image data. The interpolation is well-known in the art. Upon performing the interpolation, the demosaicking is performed to generate a set of complete colour information (for example, such as RGGB colour information or similar) for each pixel position. This is because when the at least one sub-pixel shift is performed (which is relatively lesser as compared to a number of sub-pixel shifts used in the prior art), only partial (i.e., incomplete) colour information is obtained in the at least two sub-images for each pixel position. Although more detailed visual information is captured in the at least two sub-images as compared to a single image, a minimal amount of demosaicking is still required to be performed on the at least two sub-images so that remaining colour information could also be obtained. The demosaicking would be performed in a computationally-efficient and time-efficient manner, as it would not be the same as a full conventional demosaicking. The demosaicking is well-known in the art.

In some implementations, the interpolation is performed prior to the demosaicking. In other implementations, the demosaicking and the interpolation are combined as a single operation, for example, when at least one neural network is to be employed (by the at least one processor) for performing the demosaicking and the interpolation. Optionally, the at least one processor is configured to employ a neural network for performing the interpolation and/or the demosaicking. It will be appreciated that the at least one processor is configured to employ at least one image processing algorithm for performing the demosaicking. In this regard, the at least one image processing algorithm is a modified version of image processing algorithms that are well-known in the art for performing the demosaicking. If there were only one sub-image that were processed to generate the at least one image, standard demosaicking algorithms would be used. On the other hand, if there were four sub-images that were processed to generate the at least one image, no demosaicking would be required to be performed, because image data would be available for all colours. Thus, employing the at least one image processing algorithm for processing the at least two sub-images provides an improved image quality, as compared to the standard demosaicking performed on a single sub-image. The at least one image processing algorithm may also comprise at least one of: an image denoising algorithm, an image sharpening algorithm, a colour conversion algorithm, an auto white balancing algorithm, a deblurring algorithm, a contrast enhancement algorithm, a low-light enhancement algorithm, a tone mapping algorithm, a super-resolution algorithm, an image compression algorithm. Techniques for processing image data for generating images are well-known in the art.

In an embodiment, when obtaining the at least two sub-images, the at least one processor is configured to:
- for one of the first sub-image and the second sub-image, read out one of the first image data and the second image data from those photo-sensitive cells in a second region of the photo-sensitive surface that correspond to second sub-units of smallest repeating units lying in a given row or column;
- for the one of the first sub-image and the second image, skip reading out from those photo-sensitive cells in the second region that correspond to first sub-units of a second predefined percent of the smallest repeating units lying in the given row or column, whilst reading out the one of the first image data and the second image data from those photo-sensitive cells in the second region that correspond to first sub-units of a remainder of the smallest repeating units lying in the given row or column;
- for another of the first sub-image and the second sub-image, read out another of the first image data and the second image data from those photo-sensitive cells in the second region that correspond to second sub-units of the second predefined percent of the smallest repeating units lying in the given row or column, whilst skipping reading out from those photo-sensitive cells in the second region that correspond to second sub-units of the remainder of the smallest repeating units lying in the given row or column; and
- for the another of the first sub-image and the second sub-image, skip reading out from those photo-sensitive cells in the second region that correspond to the first sub-units of the smallest repeating units lying in the given row or column.

In this regard, when the photo-sensitive surface has the second region in addition to the first region, the at least one processor is configured to selectively read out the first image data and the second image data from the second region in the aforesaid manner. Such a selective read out from the second region may, particularly, be beneficial when the second region is a peripheral region in the photo-sensitive surface, wherein the peripheral region surrounds the gaze region. Thus, the first image data (corresponding to the first sub-image) and the second image data (corresponding to the second sub-image) obtained for the second region would be processed in a similar manner, as discussed earlier with respect to the first region, in order to generate the at least one image. It will be appreciated that from a perspective of achieving a high frame rate, for a given sub-image, it may be better to read out higher amount of image data from the second region (namely, the peripheral region), while reading out relatively lesser amount of image data from the first region (namely, the gaze region). Similarly, for another (subsequent) given sub-image, it may be better to read out relatively lesser amount of image data from the second region, while reading out higher amount of image data from the first region. However, on an average, it may not matter. Thus, for the second region, reading out the first image data and the second image data could be performed in the aforesaid manner, even without considering how the first image data and the second image data are read out for the first region.

Optionally, for the first sub-image, the first image data is selectively read out from the second region. In this regard, the at least one processor reads out those photo-sensitive cells that correspond to the second sub-units of the smallest repeating units lying in the given row or column. Moreover, in the (same) given row or column, the at least one processor does not read out (namely, skips) those photo-sensitive cells that correspond to the first sub-units of the second predefined percent of said smallest repeating units. The second predefined percent could be every $N^{th}$ smallest repeating unit in the given row or column. This means that a first sub-unit of every $N^{th}$ (for example, every $2^{nd}$ or every $4^{th}$) smallest repeating unit in the given row or column would not be read out. Additionally, in the (same) given row or column, the at least one processor reads out those photo-sensitive cells that correspond to the first sub-units of the remainder of the smallest repeating units (namely, the smallest repeating units excluding the second predefined percent of the smallest repeating units). It will be appreciated that all the aforesaid processing steps can alternatively be performed for the second sub-image for capturing the second image data. Optionally, the second predefined percent lies in a range of 10 percent to 90 percent of the smallest repeating units lying in the given row or column. More optionally, the second predefined percent lies in a range of 25 percent to 75 percent of the smallest repeating units lying in the given row or column.

Optionally, for the second sub-image, the second image data is selectively read out from the second region. In this regard, the at least one processor reads out those photo-sensitive cells that correspond to the second sub-units of the second predefined percent of the smallest repeating units lying in the given row or column. This means that the second sub-units of those smallest repeating units (for example, every $N^{th}$ smallest repeating unit) in the given row or column for which the first sub-units are skipped while capturing the first sub-image, are read out. Moreover, in the (same) given row or column, the at least one processor does not read out those photo-sensitive cells that correspond to the second sub-units of the remainder of the smallest repeating units (namely, those smallest repeating units for which the first sub-units are read out while capturing the first sub-image). Additionally, in the (same) given row or column, the at least one processor does not read out those photo-sensitive cells that correspond to the first sub-units of the smallest repeating units. It will be appreciated that all the aforesaid processing steps can alternatively be performed for the first sub-image for capturing the first image data.

It will be appreciated that, for the one of the first sub-image and the second sub-image, reading out the one of the first image data and the second image data from those photo-sensitive cells in the second region that correspond to the second sub-units of the smallest repeating units does not necessarily mean that all (i.e., 100 percent) of said photo-sensitive cells are read out. Thus, even when the aforesaid read out is performed only for a predefined percent (such as 95 percent or 99 percent) of said photo-sensitive cells that correspond to the second sub-units of the smallest repeating units, it should be considered as almost a full read out. Similarly, for another of the first sub-image and the second sub-image, skipping reading out from those photo-sensitive cells in the second region that correspond to the first sub-units of the smallest repeating units does not necessarily mean that all (i.e., 100 percent) of said photo-sensitive cells are skipped. Thus, even when the aforesaid skipping is performed only for a predefined percent (such as 95 percent or 99 percent) of said photo-sensitive cells that correspond to the first sub-units of the smallest repeating units, it should be considered as almost a full skipping out.

Beneficially, a processing time for selectively reading out the first image data (for the first sub-image) and the second image data (for the second sub-image) in the second region is considerably lesser, as compared to a processing time for reading out image data from each and every photo-sensitive cell in the second region. In addition to this, reading out (and processing) the first image data and the second image data for those photo-sensitive cells in the second region that correspond to the second sub-units, enables in achieving a low noise in corresponding pixels of the at least one image (that is generated upon processing the at least two sub-images). This is because the white or near-white colour filters in the second sub-units allows to reduce noise, as a white pixel receives all the light (without filtering out any particular colour). Moreover, for the second region, due to the presence of the infrared colour filter in the second sub-unit, depth information (such as optical depth values) of pixels representing objects or their parts being imaged by the image sensor can be highly accurately estimated (namely, measured). Thus, this considerably improves a viewing experience of a user (for example, in terms of realism and immersiveness), when the at least one image is displayed to the user. This is because a region of the at least one image that corresponds to the second region would be generated with minimal (i.e., imperceptible) noise, and the user would not perceive any flicker or jerk in said region of the at least one image. This may particularly be advantageous when the second region is the peripheral region (as discussed earlier), because the noise is typically more perceivable in a peripheral region of an image, as compared to a gaze region of said image. Moreover, in such a case, for the second region, reading out and processing image data (i.e., the first image data and/or the second image data) corresponding to the colour filters of the at least three different colours would be minimally required. It will be appreciated that a selective read out of the first image data and the second image data in the second region may also facilitate in providing a high frame rate of images. This implementation has been also illustrated in conjunction with FIGS. 6E, 6F and 6G, for sake of better understanding and clarity.

Optionally, the at least one processor is configured to:
  obtain information indicative of a gaze direction of a user; and
  determine the first region in the photo-sensitive surface of the image sensor, based on the gaze direction.

Optionally, the at least one processor is configured to obtain, from a client device, the information indicative of the gaze direction. The client device could be implemented, for example, as a head-mounted display (HMD) device. Optionally, the client device comprises gaze-tracking means. The term "gaze direction" refers to a direction in which a given eye of the user is gazing. Such a gaze direction may be a gaze direction of a single user of a client device, or be an average gaze direction for multiple users of different client devices. The gaze direction may be represented by a gaze vector. Furthermore, the term "gaze-tracking means" refers to specialized equipment for detecting and/or following gaze of user's eyes. The gaze-tracking means could be implemented as contact lenses with sensors, cameras monitoring a position, a size and/or a shape of a pupil of the user's eye, and the like. The gaze-tracking means are well-known in the art. The term "head-mounted display" device refers to specialized equipment that is configured to present an extended-reality (XR) environment to a user when said HMD device, in operation, is worn by the user on his/her head. The HMD device is implemented, for example, as an XR headset, a pair of XR glasses, and the like, that is operable to display a visual scene of the XR environment to the user. The term "extended-reality" encompasses augmented reality (AR), mixed reality (MR), and the like. It will be appreciated that when the imaging system is remotely located from the client device, the at least one processor obtains the information indicative of the gaze direction from the client device. Alternatively, when the imaging system is integrated into the client device, the at least one processor obtains the information indicative of the gaze direction from the gaze-tracking means of the client device.

Optionally, the gaze direction is a current gaze direction. Alternatively, optionally, the gaze direction is a predicted gaze direction. It will be appreciated that optionally the predicted gaze direction is predicted, based on a change in user's gaze, wherein the predicted gaze direction lies along a direction of the change in the user's gaze. In such a case, the change in the user's gaze could be determined in terms of a gaze velocity and/or a gaze acceleration of the given eye, using information indicative of previous gaze directions of the given eye and/or the current gaze direction of the given eye. Yet alternatively, optionally, the gaze direction is a default gaze direction, wherein the default gaze direction is straight towards a centre of a field of view of the image sensor. In this regard, it is considered that the gaze of the user's eye is, by default, typically directed towards a centre of his/her field of view. In such a case, a central region of a field of view of the user is resolved to a much greater degree of visual detail, as compared to a remaining, peripheral region of the field of view of the user. It is to be understood that a gaze position corresponding to the default gaze direction lies at a centre of the photo-sensitive surface.

Optionally, when determining the first region in the photo-sensitive surface, the at least one processor is configured to map the gaze direction of the given eye onto the photo-sensitive surface. In this regard, the first region is understood to be the gaze region, which refers to a region in the photo-sensitive surface onto which the gaze direction is mapped. The gaze region may, for example, be a central region of the photo-sensitive surface, a top-left region of the photo-sensitive surface, a bottom-right region of the photo-sensitive surface, or similar. Optionally, upon determining the first region, the at least one processor is configured to determine the second region as a region in the photo-sensitive surface that surrounds the first region. The second region is understood to be the peripheral region, which refers to another region in the photo-sensitive surface that surrounds the gaze region. The another region may, for example, remain after excluding the gaze region from the photo-sensitive surface.

In this way, the first region and the second region are optionally determined dynamically, based on the gaze direction. Such a dynamic manner of selecting the first region and the second region beneficially emulates a way in which the user actively focuses within his/her field of view. Alternatively, in fixed-foveation implementations, the first region in the photo-sensitive surface is determined in a fixed manner, according to a centre of the photo-sensitive surface. In this regard, the gaze direction is assumed to be directed along an optical axis of the camera (i.e., directed straight towards a centre of the at least one image). Therefore, the at least one processor is configured to determine the first region at the centre of the photo-sensitive surface. This is because the user's gaze is generally directed towards a centre of his/her field of view. When the user wants to view object(s) in a periphery of his/her field of view, the user typically turns his/her head in a manner that said object(s) lie at a centre of his/her current field of view. In such a case, a central portion of the user's field of view is resolved to a much greater degree of visual detail by the fovea of the user's eye, as compared to a peripheral portion of the user's field of view. The aforesaid fixed manner of determining the first region beneficially emulates a way in which users generally focus within their fields of view. As a result, better colour reproduction is obtained for pixels of a region of the at least one image that corresponds to the first region, and minimal flicker (due to reduced noise) is obtained for pixels of a region of the at least one image that corresponds to the second region. Optionally, an angular width of the second region lies in a range of 12.5-50 degrees from a gaze position to 45-110 degrees from the gaze position, while an angular extent of the first region lies in a range of 0 degree from the gaze position to 2-50 degrees from the gaze position, wherein the gaze position is a position on the photo-sensitive surface onto which the gaze direction is mapped.

In an embodiment, the at least one other colour filter in the second sub-unit allows the at least three wavelengths corresponding to the respective ones of the at least three different colours to pass through, wherein the at least one processor is configured to:
  detect when a given criteria is satisfied, wherein the given criteria is satisfied when at least one of the following is true:
    (i) an average illuminance of a real-world environment is lower than a predefined threshold illuminance;
    (ii) a signal-to-noise ratio of the first image data and the second image data is lower than a predefined threshold value;
  when it is detected that the given criteria is satisfied, obtain at least two other sub-images from the image sensor, wherein when obtaining the at least two other sub-images, the at least one processor is configured to:
    for a third sub-image from amongst the at least two other sub-images, read out third image data from those photo-sensitive cells that correspond to second sub-units of smallest repeating units lying in a given row or column;
    for the third sub-image, skip reading out from those photo-sensitive cells that correspond to first sub-units of a third predefined percent of the smallest repeating units lying in the given row or column, whilst reading out the third image data from those photo-sensitive cells that correspond to first sub-units of a remainder of the smallest repeating units lying in the given row or column;
    for a fourth sub-image from amongst the at least two other sub-images, read out fourth image data from those photo-sensitive cells that correspond to second sub-units of the third predefined percent of the smallest repeating units lying in the given row or column, whilst skipping reading out from those photo-sensitive cells that correspond to second sub-units of the remainder of the smallest repeating units lying in the given row or column; and
    for the fourth sub-image, skip reading out from those photo-sensitive cells that correspond to the first sub-units of the smallest repeating units lying in the given row or column;
  control the wobulator to perform at least one other sub-pixel shift between the at least two other sub-images, wherein the at least one other sub-pixel shift is performed along the longitudinal axis of the given smallest repeating unit; and
  process the at least two other sub-images, to generate at least one other image.

In this regard, when the at least one other colour filter in the second sub-unit is implemented as the white or near-white colour filter, an environmental condition of the real-world environment (whereat the image sensor is present) is determined and/or a noise level in the first image data and the second image data collected by the image sensor is determined, in order to read out the third image data (corresponding to the third sub-image) and the fourth image data (corresponding to the fourth sub-image) from the image sensor in the aforesaid manner.

Optionally, the at least one processor is configured to determine the average illuminance of the real-world environment by employing at least one ambient light sensor from a given pose. Typically, ambient light sensors are designed to measure an amount of light present in their surroundings. The ambient light sensors are well-known in the art. Alternatively, optionally, the at least one processor is configured to determine the average illuminance of the real-world environment by calculating an average of illuminance values of pixels in at least one previous image that is captured using the image sensor. The term "average illuminance" of the real-world environment refers to an average amount of light intensity per unit area in the real-world environment. In other words, the average illuminance is an average brightness level across an area within the real-world environment, taking into account variations in light intensities across said area. It will be appreciated that the predefined threshold illuminance refers to a minimum allowable illuminance of the real-world environment, below which the environment conditions of the real-world environment are be considered to be low-light/dark environment conditions. Optionally, the predefined threshold illuminance lies in a range of 50 lux (namely, lumens per square meter) to 1500 lux.

Furthermore, optionally, the at least one processor is configured to determine the signal-to-noise ratio of given image data by taking into account at least one of: illuminance values of pixels in at least one previous image that is captured using the image sensor, a quality of optics (for example, such as lens, mirrors, and the like) used in the camera, an exposure time of the image sensor, a sensitivity of the image sensor, an aperture size of the image sensor, a gain condition, optical aberrations, an operating temperature of the image sensor. In an example, the signal-to-noise ratio of the given image data could be determined using a pre-defined correlation between the signal-to-noise ratio and at least one of the aforementioned factors. Typically, the signal-to-noise ratio of the given image data is a direct measure of image quality of an image that is generated upon processing the given image data. The signal-to-noise ratio is useful in ascertaining a balance between useful signal, which is the given image data, and an unwanted noise that can degrade said image. It will be appreciated that the predefined threshold value refers to a minimum allowable signal-tonoise ratio of the given image data, below which the given image data is considered to be significantly noisy. Optionally, the predefined threshold value is 45 decibels. The term "given image data" encompasses the first image data and/or the second image data.

Once it is detected that the given criteria is satisfied i.e., when the environment conditions of the real-world environment are detected to be low-light/dark environment conditions and/or when the given image data is detected to be significantly noisy, the third image data and the fourth image data are read out from the image sensor. In this regard, irrespective of any particular region in the photo-sensitive surface, the at least one processor reads out (almost all) the second sub-units in both the first region and the second region (namely, for an entirety of the image sensor), and does not read out (i.e., skips) some first sub-units (as defined according to the third predefined percent) for the entirety of the image sensor. Additionally, the at least one processor reads out some second sub-units (as defined according to the third predefined percent) for the entirety of the image sensor, and does not read out (almost all) the first sub-units for the entirety of the image sensor. Beneficially, this ensures that the third image data and the fourth would comprise considerable illuminance (namely, brightness) information of said photo-sensitive cells, in order to generate the at least one other image (upon processing the at least two other sub-images) realistically and accurately even in the low-light/dark environment conditions. Moreover, this also facilitates in achieving a low noise in at least some pixels of the at least two other sub-images. This is because the white or near-white colour filters in the second sub-units allows to reduce noise, thereby improving a signal-to-noise ratio of the third image data and the fourth image data. The third predefined percent could be every $N^{th}$ (for example, every $2^{nd}$ or every $4^{th}$) smallest repeating unit in the given row or column. Optionally, the third predefined percent lies in a range of 10 percent to 90 percent of the smallest repeating units lying in the given row or column. More optionally, the third predefined percent lies in a range of 25 percent to 75 percent of the smallest repeating units lying in the given row or column.

It will be appreciated that the at least one other sub-pixel shift between the at least two other sub-images is performed in a similar manner, as discussed earlier with respect to the at least one sub-pixel shift (that is performed between the at least two sub-images). Moreover, the third image data and the fourth image data are processed in a similar manner, as described earlier with respect to the first image data and the second image data, for generating the at least one other image.

Optionally, when reading out given image data from photo-sensitive cells in a given region of the photo-sensitive surface of the image sensor, the at least one processor is configured to employ a subsampling pattern. Herein, the term "given image data" encompasses at least one of: the first image data, the second image data, the third image data, the fourth image data. The term "given region" encompasses at least one of: the first region, the second region. The term "subsampling pattern" refers to a software-based masking pattern that enables in selectively reading out photo-sensitive cells from (the given region of the photo-sensitive surface) of the image sensor. In this regard, photo-sensitive cells whose locations are indicated in the subsampling pattern as skipped are not read out from the image sensor (and thus image data for such photo-sensitive cells is not obtained), while photo-sensitive cells whose locations are indicated in the subsampling pattern as not skipped are read out from the image sensor (and thus image data for such photo-sensitive cells is obtained). The subsampling pattern could be different for generating different regions of a same image. For example, a subsampling pattern employed for the first region could be different from a subsampling pattern employed for the second region. Optionally, the subsampling pattern is a bit mask. As an example, in the subsampling pattern, '0' could indicate a photo-sensitive cell to be skipped and '1' could indicate a photo-sensitive cell to be read out. It will be appreciated that the subsampling pattern could be a non-regular pattern, wherein the non-regular pattern is a software-based masking pattern which indicates locations of irregularly-arranged (i.e., disorderly arranged) photo-sensitive cells in the image sensor that are to be read out. The subsampling pattern could alternatively be a random pattern, a gradient-type pattern, or a regular pattern. It will also be appreciated that the aforesaid subsampling could either be performed during reading out from the image sensor or be performed prior to conversion of RAW image data into a given colour space format (for example, such as an RGB format, a Luminance and two-colour differences (YUV) format, or the like) in the ISP pipeline. Both of the aforesaid ways of subsampling are well-known in the art.

The present disclosure also relates to the method as described above. Various embodiments and variants disclosed above, with respect to the aforementioned imaging system, apply mutatis mutandis to the method.

Optionally, in the method, a step size of the at least one sub-pixel shift is Y pixels, wherein Y is an integer that lies in a range from 1 to Z, Z being equal to a number of pixels that lie in the first sub-unit along said longitudinal axis.

Optionally, in the method, the step of obtaining the at least two sub-images comprises:
  for one of the first sub-image and the second sub-image, reading out one of the first image data and the second image data from those photo-sensitive cells in a second region of the photo-sensitive surface that correspond to second sub-units of smallest repeating units lying in a given row or column;
  for the one of the first sub-image and the second image, skipping reading out from those photo-sensitive cells in the second region that correspond to first sub-units of a second predefined percent of the smallest repeating units lying in the given row or column, whilst reading out the one of the first image data and the second image data from those photo-sensitive cells in the second region that correspond to first sub-units of a remainder of the smallest repeating units lying in the given row or column;
  for another of the first sub-image and the second sub-image, reading out another of the first image data and the second image data from those photo-sensitive cells in the second region that correspond to second sub-units of the second predefined percent of the smallest repeating units lying in the given row or column, whilst skipping reading out from those photo-sensitive cells in the second region that correspond to second sub-units of the remainder of the smallest repeating units lying in the given row or column; and
  for the another of the first sub-image and the second sub-image, skipping reading out from those photo-sensitive cells in the second region that correspond to the first sub-units of the smallest repeating units lying in the given row or column.

Optionally, the method further comprises:
  obtaining information indicative of a gaze direction of a user; and determining the first region in the photo-sensitive surface of the image sensor, based on the gaze direction.

Optionally, the at least one other colour filter in the second sub-unit allows the at least three wavelengths corresponding to the respective ones of the at least three different colours to pass through, wherein the method further comprises:

detecting when a given criteria is satisfied, wherein the given criteria is satisfied when at least one of the following is true:
  (i) an average illuminance of a real-world environment is lower than a predefined threshold illuminance;
  (ii) a signal-to-noise ratio of the first image data and the second image data is lower than a predefined threshold value;

when it is detected that the given criteria is satisfied, obtaining at least two other sub-images from the image sensor, wherein the step of obtaining the at least two other sub-images comprises:
  for a third sub-image from amongst the at least two other sub-images, reading out third image data from those photo-sensitive cells that correspond to second sub-units of smallest repeating units lying in a given row or column;
  for the third sub-image, skipping reading out from those photo-sensitive cells that correspond to first sub-units of a third predefined percent of the smallest repeating units lying in the given row or column, whilst reading out the third image data from those photo-sensitive cells that correspond to first sub-units of a remainder of the smallest repeating units lying in the given row or column;
  for a fourth sub-image from amongst the at least two other sub-images, reading out fourth image data from those photo-sensitive cells that correspond to second sub-units of the third predefined percent of the smallest repeating units lying in the given row or column, whilst skipping reading out from those photo-sensitive cells that correspond to second sub-units of the remainder of the smallest repeating units lying in the given row or column; and
  for the fourth sub-image, skipping reading out from those photo-sensitive cells that correspond to the first sub-units of the smallest repeating units lying in the given row or column;

controlling the wobulator to perform at least one other sub-pixel shift between the at least two other sub-images, wherein the at least one other sub-pixel shift is performed along the longitudinal axis of the given smallest repeating unit; and processing the at least two other sub-images, to generate at least one other image.

DETAILED DESCRIPTION OF THE DRAWINGS

Referring to FIG. 1, illustrated is a block diagram of an architecture of an imaging system 100 incorporating subsampling and wobulation in colour filter arrays having smallest repeating units with different sub-units, in accordance with an embodiment of the present disclosure. The imaging system 100 comprises an image sensor 102, a wobulator 104, and at least one processor (for example, depicted as a processor 106). The image sensor 102 comprises a plurality of photo-sensitive cells 108 and a colour filter array 110. The processor 106 is communicably coupled to the image sensor 102 and the wobulator 104. The processor 106 is configured to perform various operations, as described earlier with respect to the aforementioned first aspect.

It may be understood by a person skilled in the art that FIG. 1 includes a simplified architecture of the imaging system 100, for sake of clarity, which should not unduly limit the scope of the claims herein. It is to be understood that the specific implementation of the imaging system 100 is provided as an example and is not to be construed as limiting it to specific numbers or types of image sensors, processors, photo-sensitive cells, wobulators, and colour filter arrays. The person skilled in the art will recognize many variations, alternatives, and modifications of embodiments of the present disclosure.

Figure 2:
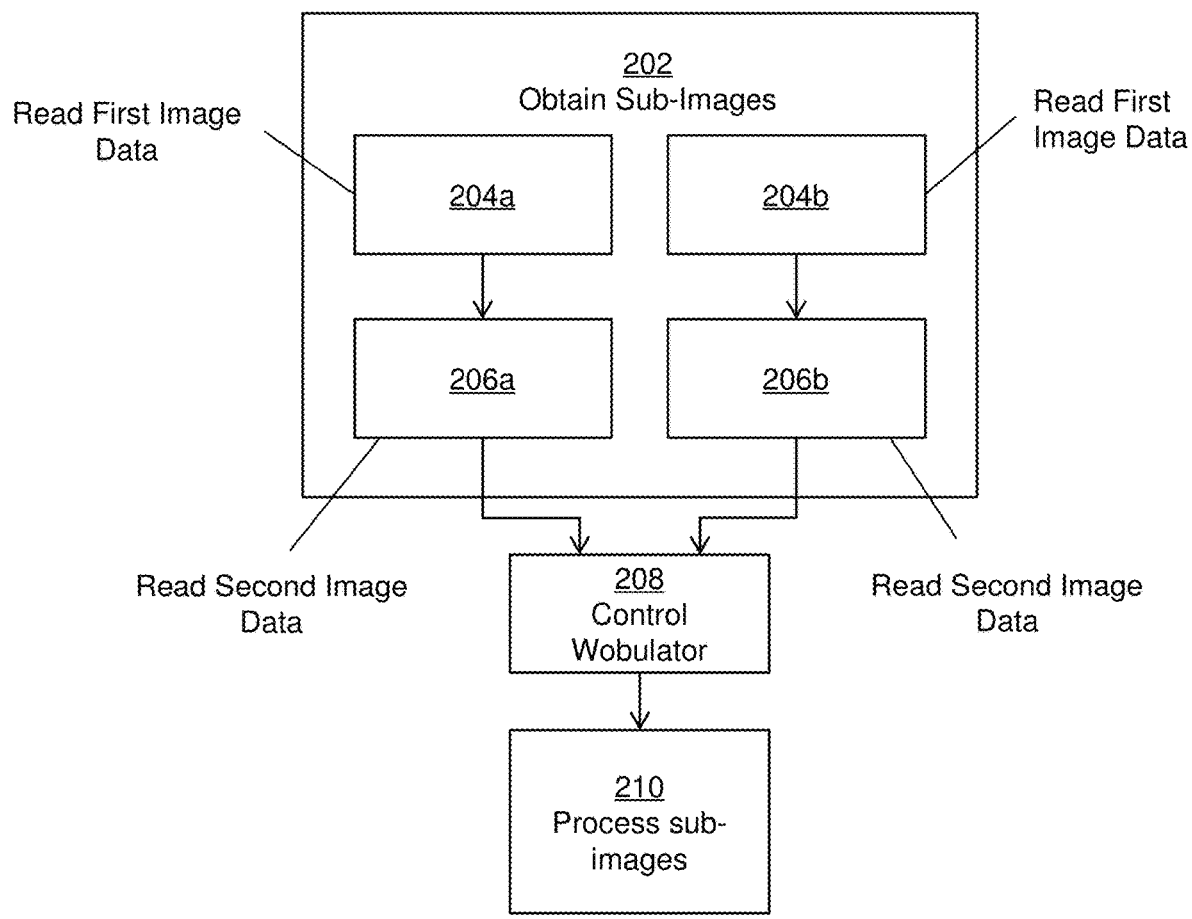
FIG. 2 illustrates steps of a method incorporating subsampling and wobulation in colour filter arrays having smallest repeating units with different sub-units, in accordance with an embodiment of the present disclosure.

Referring to FIG. 2, illustrated are steps of a method incorporating subsampling and wobulation in colour filter arrays having smallest repeating units with different sub-units, in accordance with an embodiment of the present disclosure. At step 202, at least two sub-images are obtained from an image sensor. The image sensor comprises a plurality of photo-sensitive cells arranged on a photo-sensitive surface of the image sensor, and a colour filter array comprising a plurality of smallest repeating units, the plurality of smallest repeating units being arranged in rows and columns, wherein a given smallest repeating unit comprises at least a first sub-unit and a second sub-unit, the first sub-unit comprises colour filters of at least three different colours, the second sub-unit comprises at least one other colour filter that allows to pass through at least one of: (i) at least three wavelengths corresponding to respective ones of the at least three different colours, (ii) at least one infrared wavelength. Step 202 comprises steps 204*a*, 204*b*, 206*a*, and 206*b*. In this regard, steps 204*a* and 204*b* are performed simultaneously, and then steps 206*a* and 206*b* are performed simultaneously. For a first sub-image from amongst the at least two sub-images, at step 204*a*, first image data is read out from those photo-sensitive cells in at least a first region of the photo-sensitive surface that correspond to first sub-units of smallest repeating units lying in a given row or column. Simultaneously, for the first sub-image, at step 204*b*, reading out is skipped from those photo-sensitive cells in at least the first region that correspond to second sub-units of a first predefined percent of the smallest repeating units lying in the given row or column, whilst the first image data is read out from those photo-sensitive cells in at least the first region that correspond to second sub-units of a remainder of the smallest repeating units lying in the given row or column. For a second sub-image from amongst the at least two sub-images, at step 206*a*, second image data is read out from those photo-sensitive cells in at least the first region that correspond to first sub-units of the first predefined percent of the smallest repeating units lying in the given row or column, whilst reading out is skipped from those photo-sensitive cells in at least the first region that correspond to first sub-units of the remainder of the smallest repeating units lying in the given row or column. Simultaneously, for the second sub-image, at step 206*b*, reading out is skipped from those photo-sensitive cells in at least the first region that correspond to the second sub-units of the smallest repeating units lying in the given row or column. At step 208, a wobulator is controlled to perform at least one sub-pixel shift when capturing the at least two sub-images with the image sensor, wherein the at least one sub-pixel shift is performed along a longitudinal axis of the given smallest repeating unit. At step 210, the at least two sub-images are processed to generate at least one image.

The aforementioned steps are only illustrative and other alternatives can also be provided where one or more steps are added, one or more steps are removed, or one or more steps are provided in a different sequence without departing from the scope of the claims. It will be appreciated that the first sub-image may be captured with the image sensor before or after capturing the second sub-image. Thus, the aforesaid steps 204a and 204b could be performed before or after performing the aforesaid steps 206a and 206b.

Figure 3:
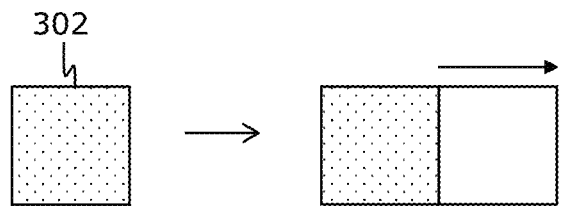
FIG. 3 illustrates an exemplary step size of a sub-pixel shift employed for capturing a sub-image, in accordance with an embodiment of the present disclosure.

Referring to FIG. 3, illustrated is an exemplary step size of a sub-pixel shift employed for capturing a sub-image, in accordance with an embodiment of the present disclosure. For sake of simplicity and better understanding, the sub-pixel shift of only a single pixel 302 (depicted using a dotted pattern) of an image sensor is shown. As shown, the step size of said sub-pixel shift (whose direction is depicted using a solid horizontal arrow) is one complete pixel, i.e., the single pixel 302 is shown to be shifted horizontally rightwards by an amount defined by the (full) size of the single pixel 302. Similarly, as an example, when the step size is two pixels, the single pixel 302 may be shifted vertically downwards by an amount defined by twice of the size of the single pixel 302.

Figure 4A:
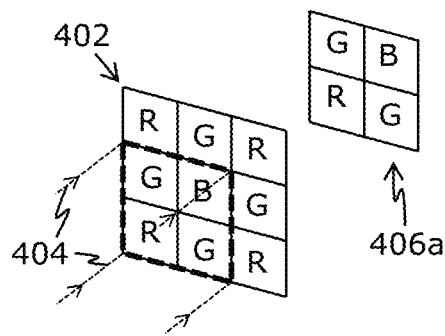
FIGS. 4A and 4B illustrate how sub-pixel shifting is performed when capturing sub-images with an image sensor, in accordance with an embodiment of the present disclosure.
Figure 4B:
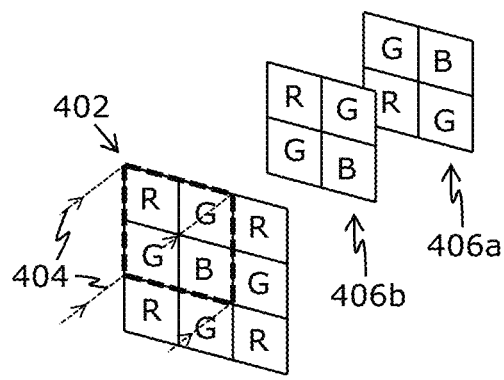

Referring to FIGS. 4A and 4B, illustrated is how sub-pixel shifting is performed when capturing sub-images with an image sensor 402, in accordance with an embodiment of the present disclosure. For sake of simplicity and better understanding, sub-pixel shifting of only a portion (depicted using a dashed box) of the image sensor 402 is shown. The image sensor 402 comprises a standard Bayer colour filter array (CFA) in which a smallest repeating 2×2 array of pixels has two green colour pixels (depicted using a letter "G"), one red colour pixel (depicted using a letter "R"), and one blue colour pixel (depicted using a letter "B"). As shown, one sub-pixel shift is performed by a wobulator for capturing two sub-images. For capturing the two sub-images, light 404 incoming from a real-world scene of a real-world environment is detected by the portion of the image sensor 402. With reference to FIG. 4A, a first sub-image 406a from amongst the two sub-images is captured when the image sensor 402 is at its existing (i.e., original) position. With reference to FIG. 4B, a second sub-image 406b from amongst the two sub-images is captured when the image sensor 402 (or the light 404) is shifted by a step size of one complete pixel in a vertically downward direction according to the one sub-pixel shift. It is to be noted that FIGS. 4A and 4B collectively represent a general concept of sub-pixel shifting (namely, wobulation). Pursuant to embodiments of the present disclosure, the first sub-image 406a and the second sub-image 406b comprise subsampled image data of a part of a field of view of the image sensor 402, wherein the subsampled image data may be subsampled according to a subsampling pattern.

Referring to FIGS. 5A, 5B, 5C, 5D, 5E, and 5F illustrate different examples of a smallest repeating unit 502a, 502b, 502c, 502d, 502e, and 502f of a colour filter array, in accordance with an embodiment of the present disclosure. With reference to FIGS. 5A-5F, "B" refers to a blue colour filter, "G" refers to a green colour filter, "R" refers to a red colour filter, "W" refers to a white or near-white colour filter, and "I" refers to an infrared colour filter. It will be appreciated that the white or near-white colour filter allows to pass through at least three wavelengths corresponding to respective ones of at least a green colour, a red colour, and a blue colour, simultaneously. Moreover, the infrared colour filter allows to pass through at least one infrared wavelength. It will also be appreciated that in some implementations, a cyan colour filter, a magenta colour filter, and a yellow colour filter could also be employed instead of employing the blue colour filter, the green colour filter, and the red colour filter, respectively.

With reference to FIGS. 5A, 5B, and 5C, the smallest repeating units 502a, 502b, and 502c are represented as 2×3 arrays of colour filters, respectively. The smallest repeating units 502a, 502b, and 502c comprise a first sub-unit 504 (depicted as a 2×2 array of colour filters, using a dashed line box), wherein the first sub-unit 504 comprises two green colour filters, one red colour filter, and one blue colour filter. The smallest repeating units 502a, 502b, and 502c comprise second sub-units 506a, 506b, and 506c (depicted as 2×1 arrays of colour filters, using dotted line boxes), respectively. With reference to FIG. 5A, the second sub-unit 506a comprises two white or near-white colour filters. With reference to FIG. 5B, the second sub-unit 506b comprises two infrared colour filters. With reference to FIG. 5C, the second sub-unit 506c comprises one white or near-white colour filter and one infrared colour filter.

With reference to FIGS. 5D and 5E, the smallest repeating units 502d and 502e are represented as 2×4 arrays of colour filters, respectively. The smallest repeating units 502d and 502e comprise the first sub-unit 504 (exactly same as described hereinabove). The smallest repeating units 502d and 502e comprise second sub-units 506d and 506e (depicted as 2×2 arrays of colour filters, using dotted line boxes), respectively. With reference to FIG. 5D, the second sub-unit 506d comprises one blue colour filter, one green colour filter, one red colour filter, and one white or near-white colour filter. With reference to FIG. 5E, the second sub-unit 506e comprises one blue colour filter, one green colour filter, one red colour filter, and one infrared colour filter.

With reference to FIG. 5F, the smallest repeating unit 502f is represented as a 4×4 array of colour filters. The smallest repeating unit 502f comprises the first sub-unit 504 and the second sub-unit 506e (exactly same as described above). The smallest repeating unit 502f further comprises a third sub-unit 508 (depicted as a 2×2 array of colour filters) and a fourth sub-unit 510 (depicted as a 2×2 array of colour filters). The third sub-unit 508 comprises one cyan colour filter (depicted using a letter "C"), two magenta colour filters (depicted using a letter "M"), and one yellow colour filter (depicted using a letter "Y"). The fourth sub-unit 510 comprises one red colour filter, one green colour filter, one blue colour filter, and one white or near-white colour filter.

With reference to FIG. 5A, the smallest repeating unit 502a has a longitudinal axis 512 (depicted as a thick dashed-double dot line), wherein the longitudinal axis 512 is an axis along which the first sub-unit 504 and the second sub-unit 506a of the smallest repeating unit 502a are vertically arranged with respect to each other. For sake of simplicity and clarity, a longitudinal axis of only one smallest repeating unit (i.e., the smallest repeating unit 502a) is shown.

FIGS. 5A-5F are merely examples, which should not unduly limit the scope of the claims herein. The person skilled in the art will recognize many variations, alternatives, and modifications of embodiments of the present disclosure. For example, the second sub-unit 506e could alternatively be a 2×3 array of colour filters, comprising one white or near-white colour filter, one blue colour filter, two green colour filters, one red colour filter, and one infrared colour filter. Similarly, any of the aforesaid first sub-units could also be a 3×3 array of colour filters, a 3×4 array of colour filters, a 4×4 array of colour filters, or similar.

Figure 6B:
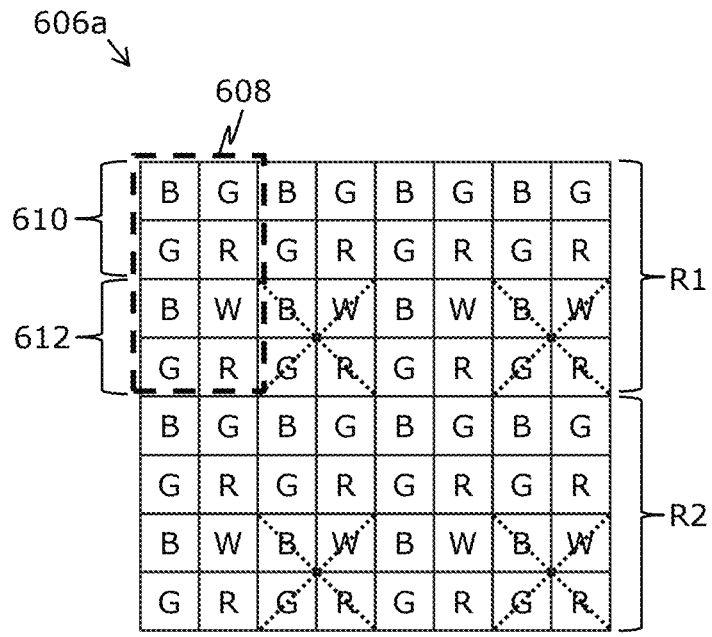
FIGS. 6B and 6C illustrate how first image data and second image data are read out from a first region of the photo-sensitive surface for capturing a first sub-image and a second sub-image, respectively.
Figure 6C:
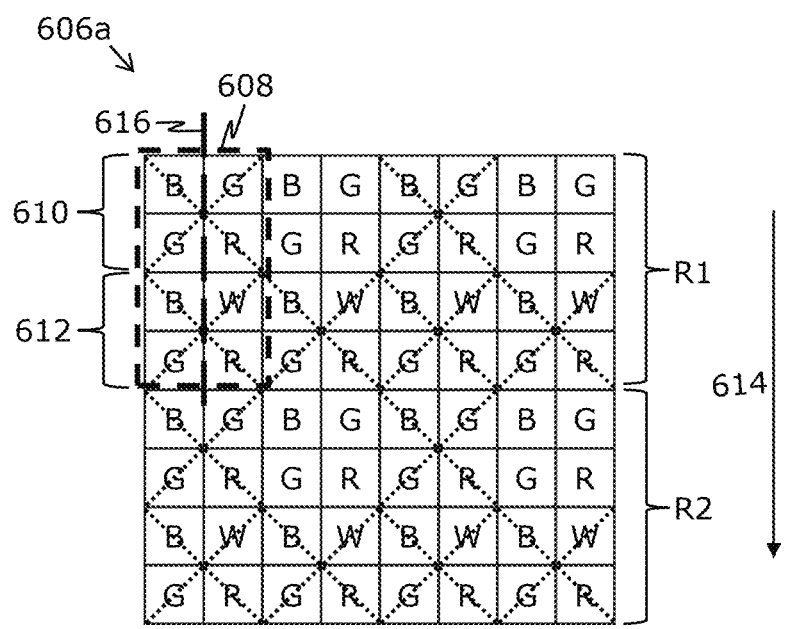
Figures 6D, 6E:
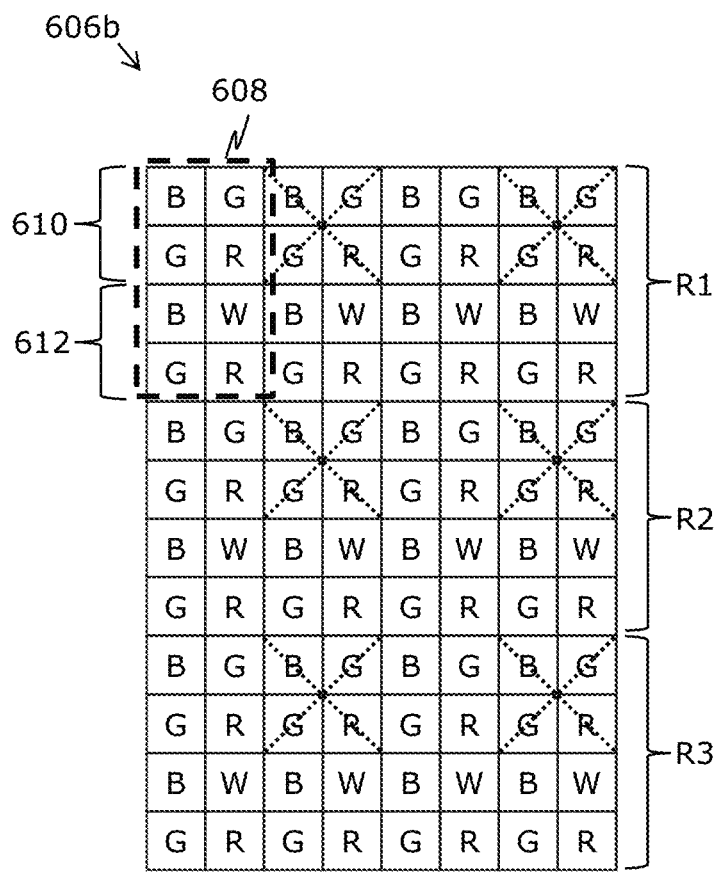
Figures 6F, 6G:
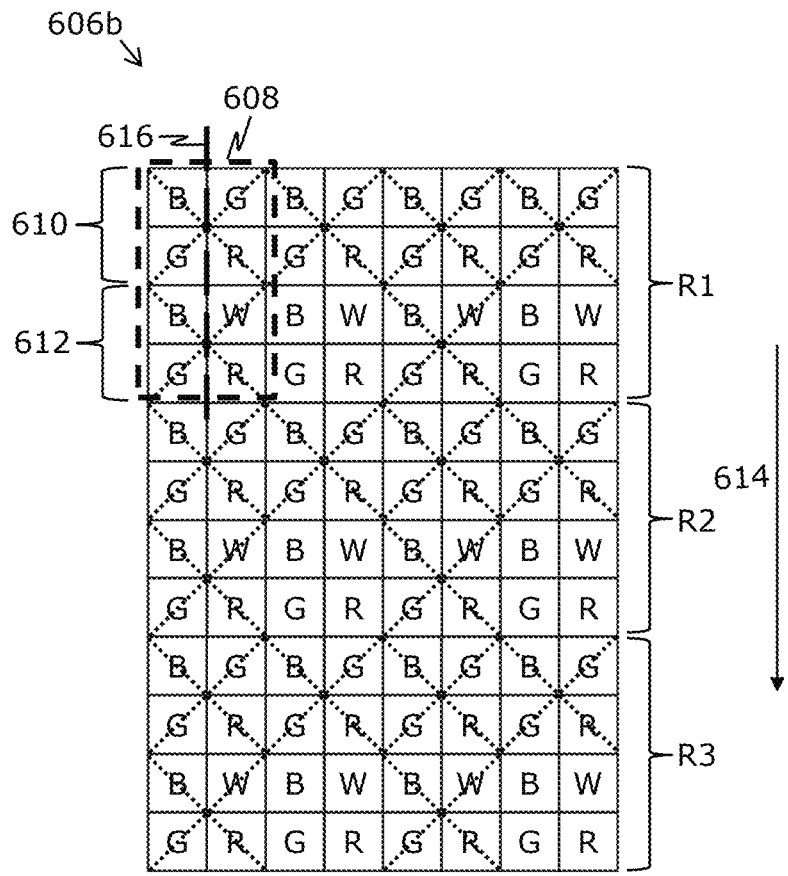

Referring to FIGS. 6A, 6B, 6C, 6D, 6E, 6F, and 6G, FIG. 6A illustrates a first region 602 and a second region 604 of a photo-sensitive surface 600 of an image sensor, FIGS. 6B and 6C illustrate how first image data and second image data are read out from the first region 602 of the photo-sensitive surface 600 for capturing a first sub-image and a second sub-image, respectively, FIG. 6D illustrates overall image data that is read out from the first region 602, FIGS. 6E and 6F illustrate how the first image data and the second image data are read out from the second region 604 of the photo-sensitive surface 600 for capturing the first sub-image and the second sub-image, respectively, while FIG. 6G illustrates overall image data that is read out from the second region 604, in accordance with an embodiment of the present disclosure.

With reference to FIG. 6A, the photo-sensitive surface 600 of the image sensor comprises the first region 602 and the second region 604, wherein the second region 604 surrounds the first region 602. The first region 602 and the second region 604 are determined (by at least one processor), based on a gaze direction of a user (for example, at a centre of the photo-sensitive surface 600). Thus, the first region 602 and the second region 604 are to be understood to be a gaze region and a peripheral region in the photo-sensitive surface 600, respectively.

With reference to FIGS. 6B-6G, "B" refers to a blue colour filter, "G" refers to a green colour filter, "R" refers to a red colour filter, "W" refers to a white or near-white colour filter, and "I" refers to an infrared colour filter. It will be appreciated that the white or near-white colour filter allows to pass through at least three wavelengths corresponding to respective ones of at least a green colour, a red colour, and a blue colour, simultaneously.

Moreover, the infrared colour filter allows to pass through at least one infrared wavelength. It will also be appreciated that in some implementations, a cyan colour filter, a magenta colour filter, and a yellow colour filter could also be employed instead of employing the blue colour filter, the green colour filter, and the red colour filter, respectively. Furthermore, the terms "first" and "second" with respect to the first sub-image and the second sub-image are used to merely distinguish between two different sub-images, and in no way refer to an order in which these two different sub-images would be captured with the image sensor. Therefore, it can be understood that the first sub-image may be captured before or after capturing the second sub-image.

With reference to FIG. 6B, there is shown how the first image data is read out from a portion 606a of the first region 602 for capturing the first sub-image. With reference to FIG. 6C, there is shown how the second image data is read out from the portion 606a of the first region 602 for capturing the second sub-image. With reference to FIGS. 6B and 6C, for sake of simplicity and clarity, the portion 606a of the first region 602 is shown to comprise 64 photo-sensitive cells arranged in an 8×8 grid. It will be appreciated that a photo-sensitive surface of a typical image sensor has millions of photo-sensitive cells (namely, pixels). The image sensor comprises a colour filter array (CFA) arranged in front of photo-sensitive cells of the photo-sensitive surface 600. As shown, the CFA comprises 8 smallest repeating units being arranged in rows and columns (for example, in form of a 4×2 array), wherein a given smallest repeating unit 608 (depicted as a 2×4 array of colour filters, using a dashed line box) comprises a first sub-unit 610 (depicted as a 2×2 array of colour filters) and a second sub-unit 612 (depicted as a 2×2 array of colour filters). The first sub-unit 610 comprises two green colour filters, one red colour filter, and one blue colour filter. The second sub-unit 612 comprises one white or near-white colour filter, one green colour filter, one red colour filter, and one blue colour filter.

With reference to FIG. 6B, for the first sub-image, the first image data is read out from 16 photo-sensitive cells that correspond to first sub-units of the 4 smallest repeating units lying in a row R1. The first image data is not read out (namely, is skipped) from 8 photo-sensitive cells (crossed out as dotted 'X's) that correspond to second sub-units of the 2 smallest repeating units (namely, every second smallest repeating unit) lying in the row R1, while the first image data is read out from 8 photo-sensitive cells that correspond to second sub-units of the remaining 2 smallest repeating units lying in the row R1. For sake of simplicity and brevity, reading out the first image data is only described for the row R1. The first image data is also read out for a row R2 in a similar manner, as described hereinabove.

With reference to FIG. 6C, for the second sub-image, the second image data is read out from those photo-sensitive cells (in the row R1) that correspond to first sub-units of the 2 smallest repeating units (namely, every second smallest repeating unit) for which the second sub-units are skipped in the first sub-image. The second image data is not read out from those photo-sensitive cells (crossed out as dotted 'X's) that correspond to first sub-units of the remaining 2 smallest repeating units (namely, those smallest repeating units for which the second sub-units are read out in the first sub-image) lying in the row R1. The second image data is not read out from 16 photo-sensitive cells (crossed out as dotted 'X's) that correspond to the second sub-units of the 4 smallest repeating units lying in the row R1. For sake of simplicity and brevity, reading out the second image data is only described for the row R1. The second image data is also read out for the row R2 in a similar manner, as described hereinabove.

With reference to FIGS. 6B and 6C, the first sub-image and the second sub-image are captured by performing only one sub-pixel shift. In this regard, the second sub-image is captured when the image sensor (or light incoming towards the image sensor) is shifted by a step size of two complete pixels in a downward direction 614 (i.e., along a longitudinal axis 616 of the given smallest repeating unit 608) according to the one sub-pixel shift. Such a sub-pixel shifting is performed by a wobulator. With reference to FIG. 6D, the overall image data is obtained by combining the first image data and the second image data that are read out from the portion 606a of the first region 602. By performing the one sub-pixel shift in the aforesaid manner, all photo-sensitive cells in the portion 606a of the first region 602 are read out.

With reference to FIG. 6E, there is shown how the first image data is read out from a portion 606b of the second region 604 for capturing the first sub-image. With reference to FIG. 6F, there is shown how the second image data is read out from the portion 606b of the second region 604 for capturing the second sub-image. With reference to FIGS. 6E and 6F, for sake of simplicity and clarity, the portion 606b of the second region 604 is shown to comprise 96 photo-sensitive cells arranged in a 8×12 grid. It will be appreciated that a photo-sensitive surface of a typical image sensor has millions of photo-sensitive cells (namely, pixels). The image sensor comprises a colour filter array (CFA) arranged in front of photo-sensitive cells of the photo-sensitive surface 600. As shown, the CFA comprises 12 smallest repeating units being arranged in rows and columns (for example, in form of a 4×3 array), wherein a given smallest repeating unit is exactly same as the given smallest repeating unit 608, which has been described earlier with reference to FIGS. 6B and 6C.

With reference to FIG. 6E, for the first sub-image, the first image data is read out from 16 photo-sensitive cells that correspond to second sub-units of the 4 smallest repeating units lying in the row R1. The first image data is not read out (namely, is skipped) from 8 photo-sensitive cells (crossed out as dotted 'X's) that correspond to first sub-units of the 2 smallest repeating units (namely, every second smallest repeating unit) lying in the row R1, while the first image data is read out from 8 photo-sensitive cells that correspond to first sub-units of the remaining 2 smallest repeating units lying in the row R1. For sake of simplicity and brevity, reading out the first image data is only described for the row R1. The first image data is also read out for rows R2 and R3 in a similar manner, as described hereinabove.

With reference to FIG. 6F, for the second sub-image, the second image data is read out from those photo-sensitive cells (in the row R1) that correspond to second sub-units of the 2 smallest repeating units (namely, every second smallest repeating unit) for which the first sub-units are skipped in the first sub-image. The second image data is not read out from those photo-sensitive cells (crossed out as dotted 'X's) that correspond to second sub-units of the remaining 2 smallest repeating units (namely, those smallest repeating units for which the first sub-units are read out in the first sub-image) lying in the row R1. The second image data is not read out from 16 photo-sensitive cells (crossed out as dotted 'X's) that correspond to the first sub-units of the 4 smallest repeating units lying in the row R1. For sake of simplicity and brevity, reading out the second image data is only described for the row R1. The second image data is also read out for the rows R2 and R3 in a similar manner, as described hereinabove.

With reference to FIGS. 6E and 6F, the first sub-image and the second sub-image are captured by performing only the one sub-pixel shift. In this regard, the second sub-image is captured when the image sensor (or light incoming towards the image sensor) is shifted by the step size of the two complete pixels in the downward direction 614 (i.e., along the longitudinal axis 616 of the given smallest repeating unit 608) according to the one sub-pixel shift. With reference to FIG. 6G, for the rows R2 and R3, the overall image data is obtained by combining the first image data and the second image data that are read out from the portion 606b of the second region 604. By performing the one sub-pixel shift in the aforesaid manner, all photo-sensitive cells in the portion 606b of the first region 602 are read out, for the rows R2 and R3.

FIGS. 3, 4A-4B, FIGS. 5A-5F, and FIGS. 6A-6G are merely examples, which should not unduly limit the scope of the claims herein. The person skilled in the art will recognize many variations, alternatives, and modifications of embodiments of the present disclosure.

The invention claimed is:

1. An imaging system comprising:
    an image sensor comprising:
        a plurality of photo-sensitive cells arranged on a photo-sensitive surface of the image sensor; and
        a colour filter array comprising a plurality of smallest repeating units, the plurality of smallest repeating units being arranged in rows and columns, wherein:
            a given smallest repeating unit comprises at least a first sub-unit and a second sub-unit,
            the first sub-unit comprises colour filters of at least three different colours,
            the second sub-unit comprises at least one other colour filter that allows to pass through at least one of: (i) at least three wavelengths corresponding to respective ones of the at least three different colours, (ii) at least one infrared wavelength;
    a wobulator that is to be employed to perform sub-pixel shifts when capturing sub-images with the image sensor; and
    at least one processor configured to:
        obtain at least two sub-images from the image sensor, wherein when obtaining the at least two sub-images, the at least one processor is configured to:
            for a first sub-image from amongst the at least two sub-images, read out first image data from those photo-sensitive cells in at least a first region of the photo-sensitive surface that correspond to first sub-units of smallest repeating units lying in a given row or column;
            for the first sub-image, skip reading out from those photo-sensitive cells in at least the first region that correspond to second sub-units of a first pre-defined percent of the smallest repeating units lying in the given row or column, whilst reading out the first image data from those photo-sensitive cells in at least the first region that correspond to second sub-units of a remainder of the smallest repeating units lying in the given row or column;
            for a second sub-image from amongst the at least two sub-images, read out second image data from those photo-sensitive cells in at least the first region that correspond to first sub-units of the first predefined percent of the smallest repeating units lying in the given row or column, whilst skipping reading out from those photo-sensitive cells in at least the first region that correspond to first sub-units of the remainder of the smallest repeating units lying in the given row or column; and
            for the second sub-image, skip reading out from those photo-sensitive cells in at least the first region that correspond to the second sub-units of the smallest repeating units lying in the given row or column;
        control the wobulator to perform at least one sub-pixel shift between the at least two sub-images, wherein the at least one sub-pixel shift is performed along a longitudinal axis of the given smallest repeating unit; and
        process the at least two sub-images, to generate at least one image.

2. The imaging system of claim 1, wherein a step size of the at least one sub-pixel shift is Y pixels, wherein Y is an integer that lies in a range from 1 to Z, Z being equal to a number of pixels that lie in the first sub-unit along said longitudinal axis.

3. The imaging system of claim 1, wherein when obtaining the at least two sub-images, the at least one processor is configured to:
    for one of the first sub-image and the second sub-image, read out one of the first image data and the second image data from those photo-sensitive cells in a second region of the photo-sensitive surface that correspond to second sub-units of smallest repeating units lying in a given row or column;
    for the one of the first sub-image and the second image, skip reading out from those photo-sensitive cells in the second region that correspond to first sub-units of a second predefined percent of the smallest repeating units lying in the given row or column, whilst reading out the one of the first image data and the second image data from those photo-sensitive cells in the second region that correspond to first sub-units of a remainder of the smallest repeating units lying in the given row or column;

for another of the first sub-image and the second sub-image, read out another of the first image data and the second image data from those photo-sensitive cells in the second region that correspond to second sub-units of the second predefined percent of the smallest repeating units lying in the given row or column, whilst skipping reading out from those photo-sensitive cells in the second region that correspond to second sub-units of the remainder of the smallest repeating units lying in the given row or column; and for the another of the first sub-image and the second sub-image, skip reading out from those photo-sensitive cells in the second region that correspond to the first sub-units of the smallest repeating units lying in the given row or column.

4. The imaging system of claim 1, wherein the at least one processor is configured to:
obtain information indicative of a gaze direction of a user; and
determine the first region in the photo-sensitive surface of the image sensor, based on the gaze direction.

5. The imaging system of claim 1, wherein the at least one other colour filter in the second sub-unit allows the at least three wavelengths corresponding to the respective ones of the at least three different colours to pass through, and wherein the at least one processor is configured to:
detect when a given criteria is satisfied, wherein the given criteria is satisfied when at least one of the following is true:
(i) an average illuminance of a real-world environment is lower than a predefined threshold illuminance;
(ii) a signal-to-noise ratio of the first image data and the second image data is lower than a predefined threshold value;
when it is detected that the given criteria is satisfied, obtain at least two other sub-images from the image sensor, wherein when obtaining the at least two other sub-images, the at least one processor is configured to:
for a third sub-image from amongst the at least two other sub-images, read out third image data from those photo-sensitive cells that correspond to second sub-units of smallest repeating units lying in a given row or column;
for the third sub-image, skip reading out from those photo-sensitive cells that correspond to first sub-units of a third predefined percent of the smallest repeating units lying in the given row or column, whilst reading out the third image data from those photo-sensitive cells that correspond to first sub-units of a remainder of the smallest repeating units lying in the given row or column;
for a fourth sub-image from amongst the at least two other sub-images, read out fourth image data from those photo-sensitive cells that correspond to second sub-units of the third predefined percent of the smallest repeating units lying in the given row or column, whilst skipping reading out from those photo-sensitive cells that correspond to second sub-units of the remainder of the smallest repeating units lying in the given row or column; and for the fourth sub-image, skip reading out from those photo-sensitive cells that correspond to the first sub-units of the smallest repeating units lying in the given row or column;
control the wobulator to perform at least one other sub-pixel shift between the at least two other sub-images, wherein the at least one other sub-pixel shift is performed along the longitudinal axis of the given smallest repeating unit; and
process the at least two other sub-images, to generate at least one other image.

6. A method comprising:
obtaining at least two sub-images from an image sensor, wherein the image sensor comprises a plurality of photo-sensitive cells arranged on a photo-sensitive surface of the image sensor, and a colour filter array comprising a plurality of smallest repeating units, the plurality of smallest repeating units being arranged in rows and columns, wherein a given smallest repeating unit comprises at least a first sub-unit and a second sub-unit, the first sub-unit comprises colour filters of at least three different colours, the second sub-unit comprises at least one other colour filter that allows to pass through at least one of: (i) at least three wavelengths corresponding to respective ones of the at least three different colours, (ii) at least one infrared wavelength, wherein the step of obtaining the at least two sub-images comprises:
for a first sub-image from amongst the at least two sub-images, reading out first image data from those photo-sensitive cells in at least a first region of the photo-sensitive surface that correspond to first sub-units of smallest repeating units lying in a given row or column;
for the first sub-image, skipping reading out from those photo-sensitive cells in at least the first region that correspond to second sub-units of a first predefined percent of the smallest repeating units lying in the given row or column, whilst reading out the first image data from those photo-sensitive cells in at least the first region that correspond to second sub-units of a remainder of the smallest repeating units lying in the given row or column;
for a second sub-image from amongst the at least two sub-images, reading out second image data from those photo-sensitive cells in at least the first region that correspond to first sub-units of the first predefined percent of the smallest repeating units lying in the given row or column, whilst skipping reading out from those photo-sensitive cells in at least the first region that correspond to first sub-units of the remainder of the smallest repeating units lying in the given row or column; and
for the second sub-image, skipping reading out from those photo-sensitive cells in at least the first region that correspond to the second sub-units of the smallest repeating units lying in the given row or column;
controlling a wobulator to perform at least one sub-pixel shift when capturing the at least two sub-images with the image sensor, wherein the at least one sub-pixel shift is performed along a longitudinal axis of the given smallest repeating unit; and
processing the at least two sub-images, to generate at least one image.

7. The method of claim 6, wherein a step size of the at least one sub-pixel shift is Y pixels, wherein Y is an integer that lies in a range from 1 to Z, Z being equal to a number of pixels that lie in the first sub-unit along said longitudinal axis.

8. The method of claim 6, wherein the step of obtaining the at least two sub-images comprises:
for one of the first sub-image and the second sub-image, reading out one of the first image data and the second image data from those photo-sensitive cells in a second region of the photo-sensitive surface that correspond to second sub-units of smallest repeating units lying in a given row or column;
for the one of the first sub-image and the second image, skipping reading out from those photo-sensitive cells in the second region that correspond to first sub-units of a second predefined percent of the smallest repeating units lying in the given row or column, whilst reading out the one of the first image data and the second image data from those photo-sensitive cells in the second region that correspond to first sub-units of a remainder of the smallest repeating units lying in the given row or column;
for another of the first sub-image and the second sub-image, reading out another of the first image data and the second image data from those photo-sensitive cells in the second region that correspond to second sub-units of the second predefined percent of the smallest repeating units lying in the given row or column, whilst skipping reading out from those photo-sensitive cells in the second region that correspond to second sub-units of the remainder of the smallest repeating units lying in the given row or column; and
for the another of the first sub-image and the second sub-image, skipping reading out from those photo-sensitive cells in the second region that correspond to the first sub-units of the smallest repeating units lying in the given row or column.

9. The method of claim 6, further comprising:
obtaining information indicative of a gaze direction of a user; and
determining the first region in the photo-sensitive surface of the image sensor, based on the gaze direction.

10. The method of claim 6, wherein the at least one other colour filter in the second sub-unit allows the at least three wavelengths corresponding to the respective ones of the at least three different colours to pass through, and wherein the method further comprises:
detecting when a given criteria is satisfied, wherein the given criteria is satisfied when at least one of the following is true:
(i) an average illuminance of a real-world environment is lower than a predefined threshold illuminance;
(ii) a signal-to-noise ratio of the first image data and the second image data is lower than a predefined threshold value;
when it is detected that the given criteria is satisfied, obtaining at least two other sub-images from the image sensor, wherein the step of obtaining the at least two other sub-images comprises:
for a third sub-image from amongst the at least two other sub-images, reading out third image data from those photo-sensitive cells that correspond to second sub-units of smallest repeating units lying in a given row or column;
for the third sub-image, skipping reading out from those photo-sensitive cells that correspond to first sub-units of a third predefined percent of the smallest repeating units lying in the given row or column, whilst reading out the third image data from those photo-sensitive cells that correspond to first sub-units of a remainder of the smallest repeating units lying in the given row or column;
for a fourth sub-image from amongst the at least two other sub-images, reading out fourth image data from those photo-sensitive cells that correspond to second sub-units of the third predefined percent of the smallest repeating units lying in the given row or column, whilst skipping reading out from those photo-sensitive cells that correspond to second sub-units of the remainder of the smallest repeating units lying in the given row or column; and
for the fourth sub-image, skipping reading out from those photo-sensitive cells that correspond to the first sub-units of the smallest repeating units lying in the given row or column;
controlling the wobulator to perform at least one other sub-pixel shift between the at least two other sub-images, wherein the at least one other sub-pixel shift is performed along the longitudinal axis of the given smallest repeating unit; and
processing the at least two other sub-images, to generate at least one other image.

* * * * *